United States Patent [19]
Schleuder et al.

[11] Patent Number: 5,916,051
[45] Date of Patent: Jun. 29, 1999

[54] HYDRAULIC SHIFT SYSTEM FOR A TRANSFER CASE

[75] Inventors: Carl D. Schleuder, Novi; Edward J. Ziegler, Jackson, both of Mich.

[73] Assignee: New Venture Gear, Inc., Troy, Mich.

[21] Appl. No.: 09/040,687

[22] Filed: Mar. 10, 1998

Related U.S. Application Data

[60] Provisional application No. 60/041,286, Mar. 21, 1997.

[51] Int. Cl.$^6$ .................................................... F16H 59/04
[52] U.S. Cl. ............................................................ 475/138
[58] Field of Search ................................... 475/131, 135, 475/136, 138, 295; 74/335

[56] References Cited

U.S. PATENT DOCUMENTS

| | | |
|---|---|---|
| 4,770,280 | 9/1988 | Frost . |
| 5,076,112 | 12/1991 | Williams . |
| 5,159,847 | 11/1992 | Williams et al. . |
| 5,346,442 | 9/1994 | Eastman . |
| 5,377,800 | 1/1995 | Sperduti et al. . |

*Primary Examiner*—Dirk Wright
*Attorney, Agent, or Firm*—Harness, Dickey & Pierce, P.L.C.

[57] ABSTRACT

A hydraulic shift system for a four-wheel drive transfer case is disclosed. The hydraulic shift system includes a pump, a pressure regulator, an accumulator, a control valve, a range shift assembly, a mode shift assembly, and a shift actuator. The pump supplies hydraulic pressure to the accumulator which is in communication with the control valve. The shift actuator controls the delivery of hydraulic pressure from the control valve to the range shift assembly and the mode shift assembly in response to actuation by the vehicle operator of a mode select mechanism.

18 Claims, 21 Drawing Sheets

2WH

4WH

NEU

4WL

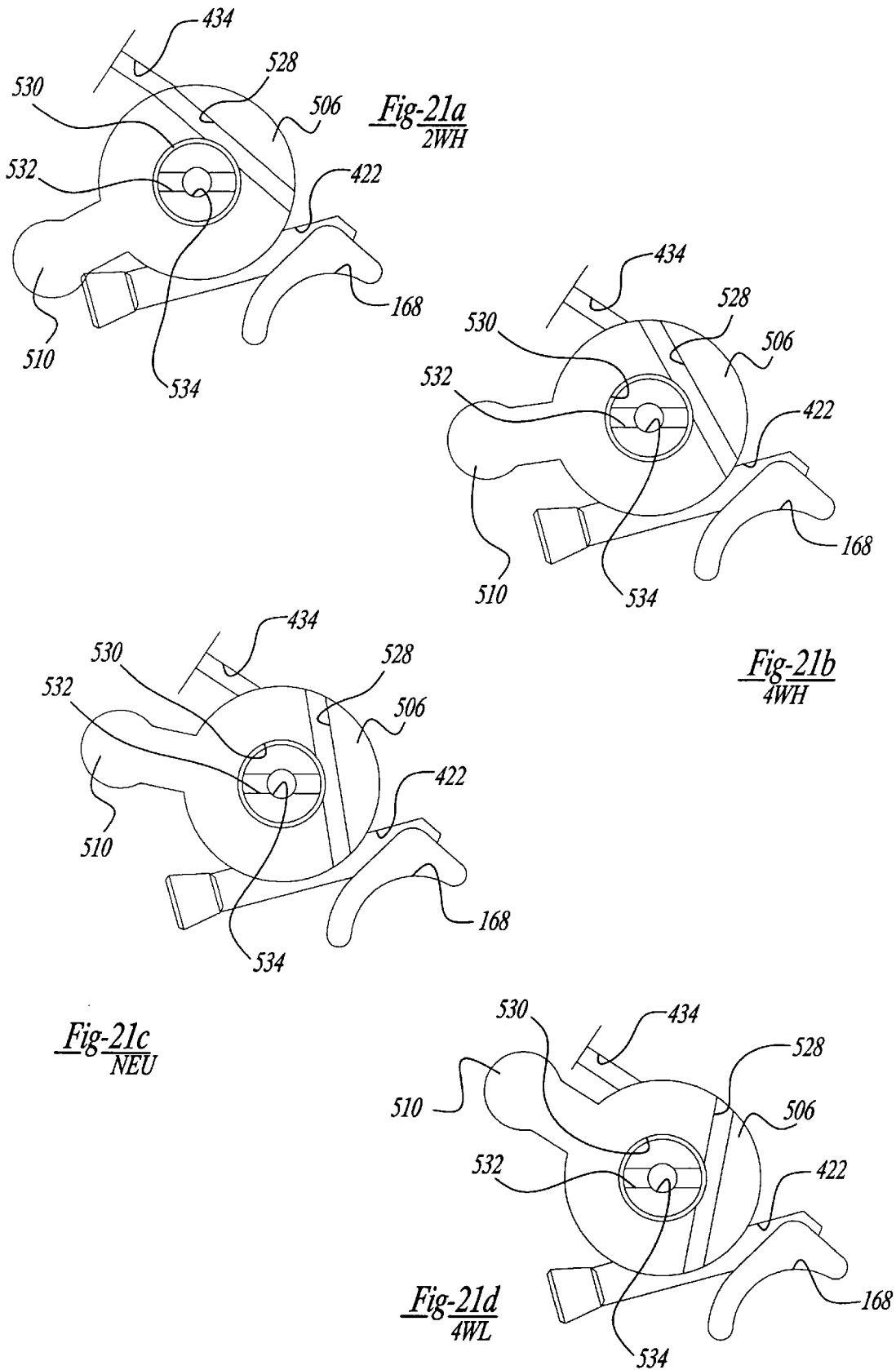

HYDRAULIC SHIFT SYSTEM FOR A TRANSFER CASE

This application claims benefit of priority application Ser. No. 60/041,286 filed on Mar. 21, 1997.

BACKGROUND OF THE INVENTION

The present invention relates generally to shift systems for power transfer devices and, more particularly, to a hydraulic shift system for a four-wheel drive transfer case.

With the advent of increased consumer popularity in four-wheel drive passenger cars and sport/utility vehicles, power transfer devices are more frequently being incorporated in vehicular driveline applications. As is known, part-time transfer cases are used in four-wheel drive vehicles for selectively directing power to the non-driven wheels upon shifting from the two-wheel drive mode to the four-wheel drive mode. More particularly, most part-time transfer cases use a transmission-type synchronized dog clutch for shifting "on-the-fly" from the two-wheel drive to four-wheel drive mode. The dog clutch can be actuated manually via a shift lever or it may be remotely actuated, as in an electrically-controlled shift system equipped with a power-operated actuator.

In addition, part-time transfer cases are also equipped with a two-speed planetary gearset for establishing high-range and low-range drive modes. Typically, a non-synchronized dog clutch is used for shifting between the high-range and low-range drive modes. An example of a part-time two-speed transfer case is disclosed in commonly-owned U.S. Pat. No. 4,770,280. Moreover, recent efforts have been made to provide "on-the-fly" shifting between the high and low-range drive modes. An example of a synchronized range shift system is shown in commonly-owned U.S. Pat. No. 5,346,442.

One drawback associated with conventional part-time transfer cases is that it is sometimes difficult, particularly during cold weather start-ups, to shift into the four-wheel drive mode. In manually-actuated part-time transfer cases, the vehicle operator may be required to exert a large input force on the shift lever to overcome the shift resistance associated with cold shifting into the four-wheel drive mode. Similarly, in electrically-actuated shift systems the electric motor must continue to provide a large input force during an extended shift period which, in some instances, may overload the electric motor. In other instances, the electric motor may generate an excessive amount of shifting force, causing the shifting process to be noticeably harsh and abrupt. As such, efforts have been made to reduce the shift effort and provide the vehicle operator with a means for smoothly shifting between the available modes. For example, commonly-owned U.S. Pat. No. 5,076,112 discloses an arrangement for reducing shift efforts in mechanically-operated shift systems. As a further example, commonly-owned U.S. Pat. No. 5,377,800 discloses a hydraulically-actuated mode shift system for a transfer case. While such systems are satisfactory for their intended purpose, a need still exists to continue development of alternative shift systems.

SUMMARY OF THE INVENTION

It is therefore an object of the present invention to provide an improved hydraulic shift mechanism capable of providing on-the-fly mode and range shifting in a part-time transfer case.

Accordingly, the present invention is primarily directed to a hydraulic shift system for a four-wheel drive transfer case. In particular, the hydraulic shift system includes a pump, a pressure regulator, an accumulator, a control valve, a range shift assembly, a mode shift assembly, and a shift actuator. The pump supplies hydraulic pressure to the accumulator which is in communication with the control valve. The shift actuator controls the delivery of hydraulic pressure from the control valve to the range shift assembly and the mode shift assembly in response to actuation by the vehicle operator of a mode select mechanism.

BRIEF DESCRIPTION OF THE DRAWINGS

Further objects, features and advantages of the present invention will become apparent from the following description and accompanying drawings in which:

FIGS. 21a, 21b, 21c and 21d shows the components of the mode shift assembly positioned to respectively establish the two-wheel high-range drive mode, the four-wheel high-range drive mode, the neutral mode, and the four-wheel low-range drive mode.

DETAILED DESCRIPTION OF THE PREFERRED EMBODIMENT

Figure 1:
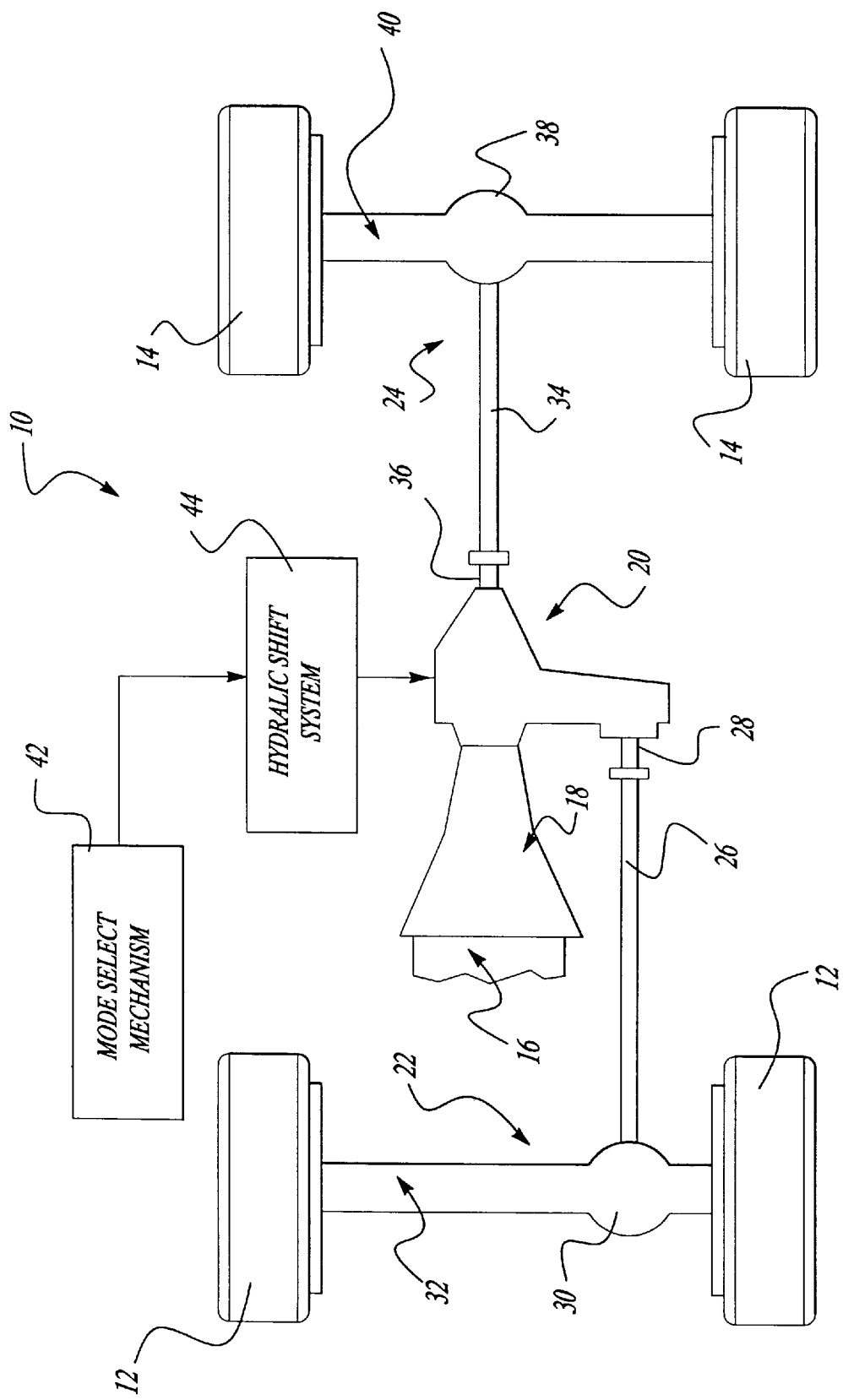
FIG. 1 is a schematic representation of a four-wheel drive motor vehicle equipped with a transfer case having a hydraulic shift system according to the present invention.

Referring to FIG. 1 of the drawings, an exemplary drivetrain for a four-wheel drive vehicle is identified by reference numeral 10. Drivetrain 10 includes a pair of front wheels 12 and a pair of rear wheels 14 drivable from a source of power, such as engine 16, through a transmission 18. As show, drivetrain 10 includes a transfer case 20 which functions to transfer drive torque delivered from transmission 18 to front wheels 12 and rear wheels 14 through front and rear drivelines 22 and 24, respectively. Front driveline 22 includes a front prop shaft 26 connected between a front output shaft 28 of transfer case 20 and a front differential 30 associated with a front axle assembly 32, the opposite ends of which are coupled to front wheels 12. Similarly, rear driveline 24 includes a rear prop shaft 34 connected between a rear output shaft 36 of transfer case 20 and a rear differential 38 associated with a rear axle assembly 40, the opposite ends of which are coupled to rear wheels 14. A mode select mechanism 42 is interconnected to a hydraulic shift system 44 associated with transfer case 20 to permit the vehicle operator to select a particular mode of operation.

Figure 2:
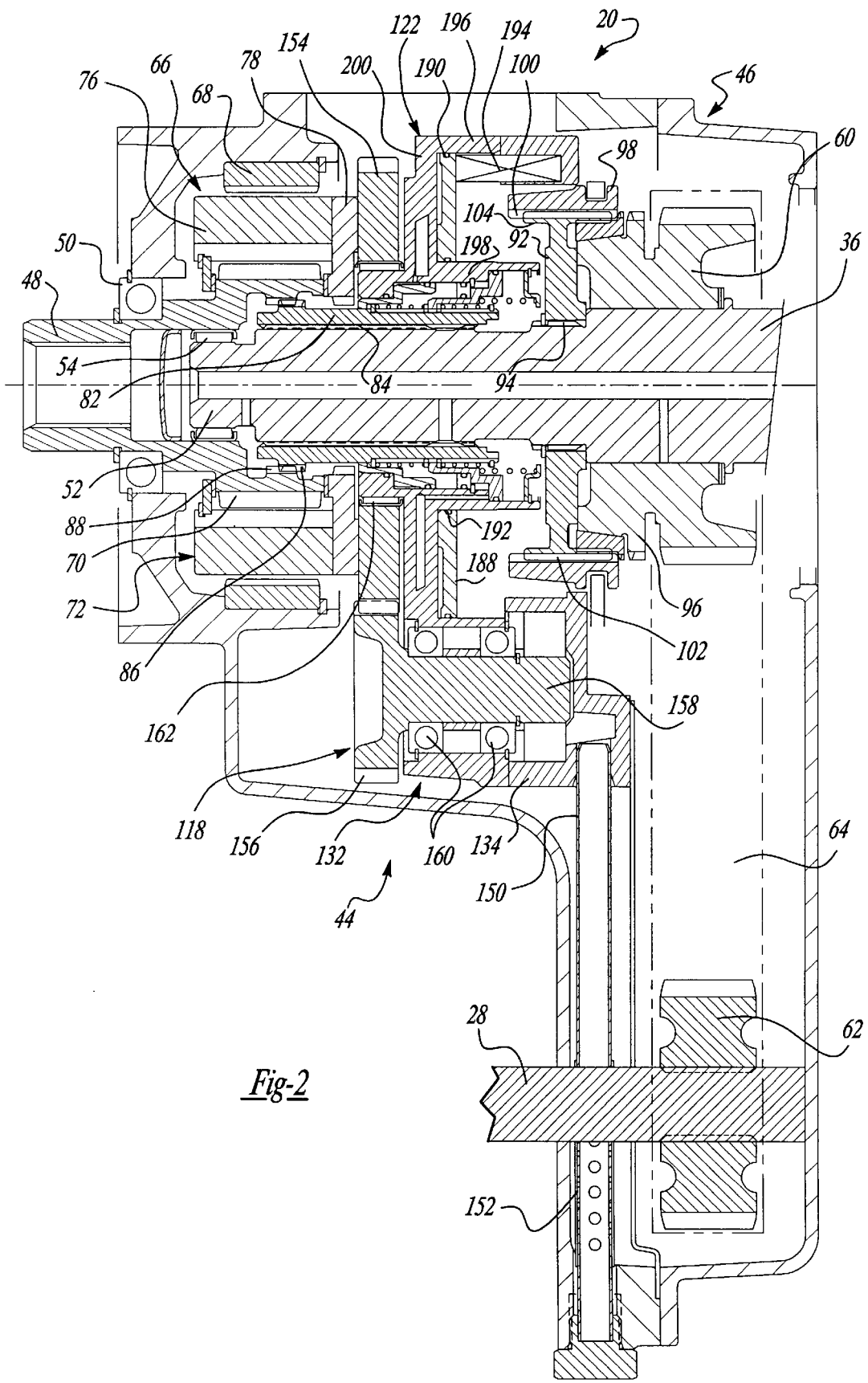
FIG. 2 is a sectional view of a two-speed part-time transfer case equipped with the hydraulic shift system of the present invention.

Referring now to FIG. 2, a preferred construction for transfer case 20 is shown. Transfer case 20 includes a housing assembly 46 from which an input shaft 48 is rotatably supported by a bearing assembly 50. Input shaft 48 is adapted for connection to the output shaft of transmission 18. Rear output shaft 36 is commonly aligned on the rotary axis of input shaft 48 and includes a pilot segment 52 supported by a bearing assembly 54 within a pilot bore formed in input shaft 48. While not shown, the opposite end of rear output shaft 36 is also rotatably supported by a bearing assembly from housing 46. Rear output shaft 36 is adapted for connection to rear prop shaft 34 in a conventional manner. To provide means for transferring drive torque from rear output shaft 36 to front output shaft 28, transfer case 20 is shown to include a drive sprocket 60 rotatably supported on rear output shaft 36, a driven sprocket 62 fixed to front output shaft 28, and a continuous drive chain 64 coupling driven sprocket 62 for rotation with drive sprocket 60. Front output shaft 28 is adapted for connection to front prop shaft 26 in a conventional manner.

Figure 4:
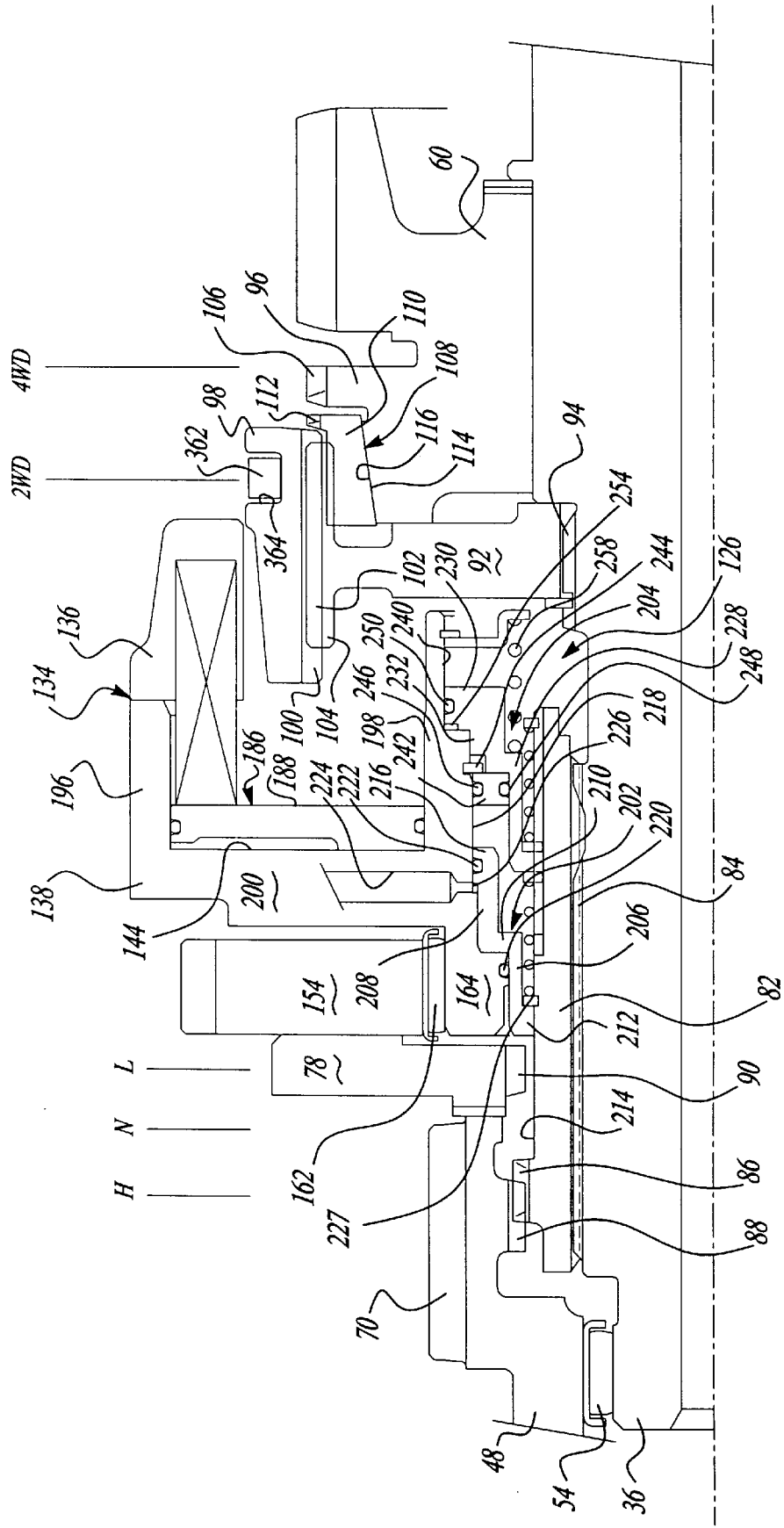
FIG. 4 is an enlarged partial view of FIG. 1 showing components of the range shift assembly and the mode shift assembly positioned to establish a two-wheel high-range drive mode.
Figure 7A:
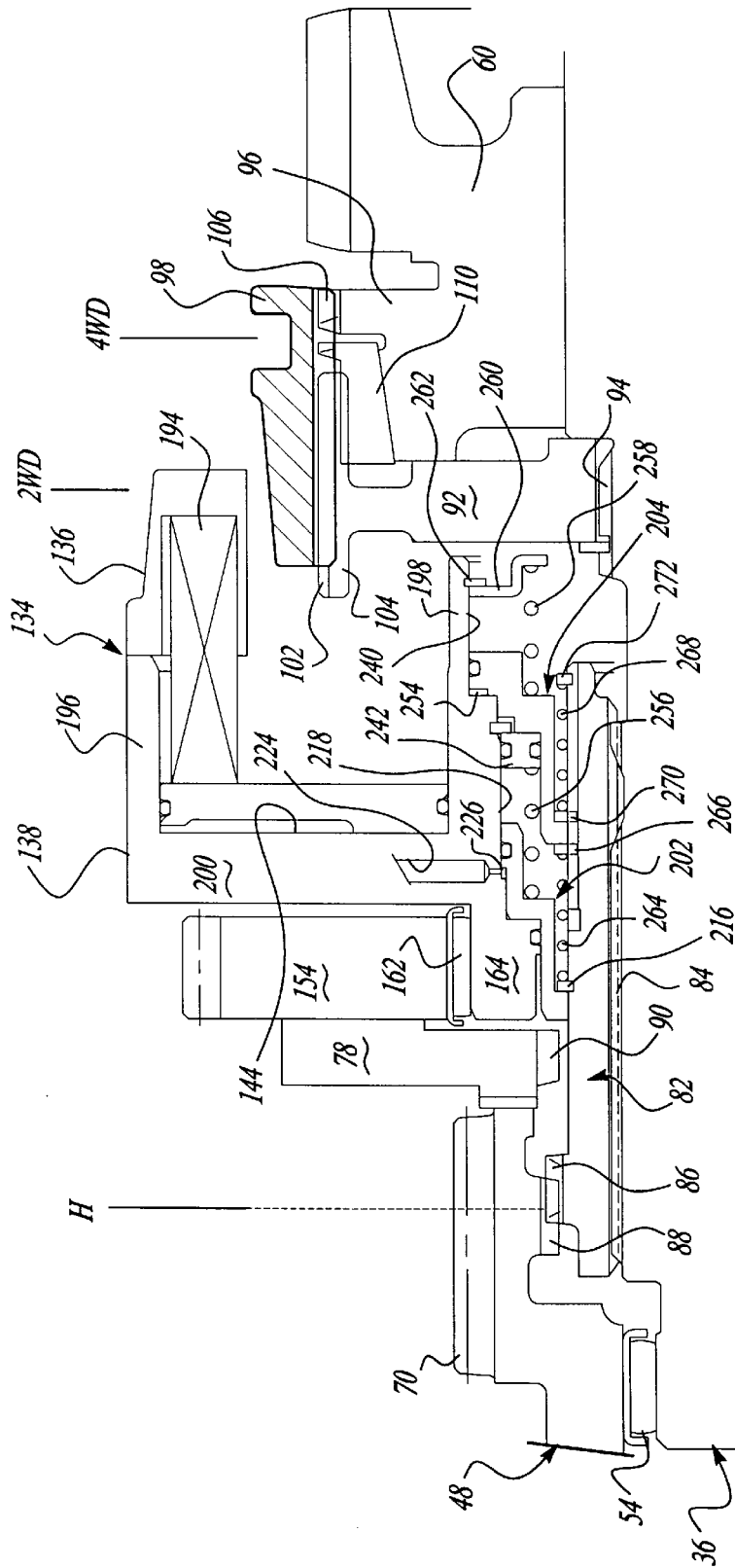
FIGS. 7a and 7b are generally similar to FIGS. 4 and 5, respectively, but show the components of the hydraulic shift system positioned to establish a four-wheel high-range drive mode.
Figure 8A:
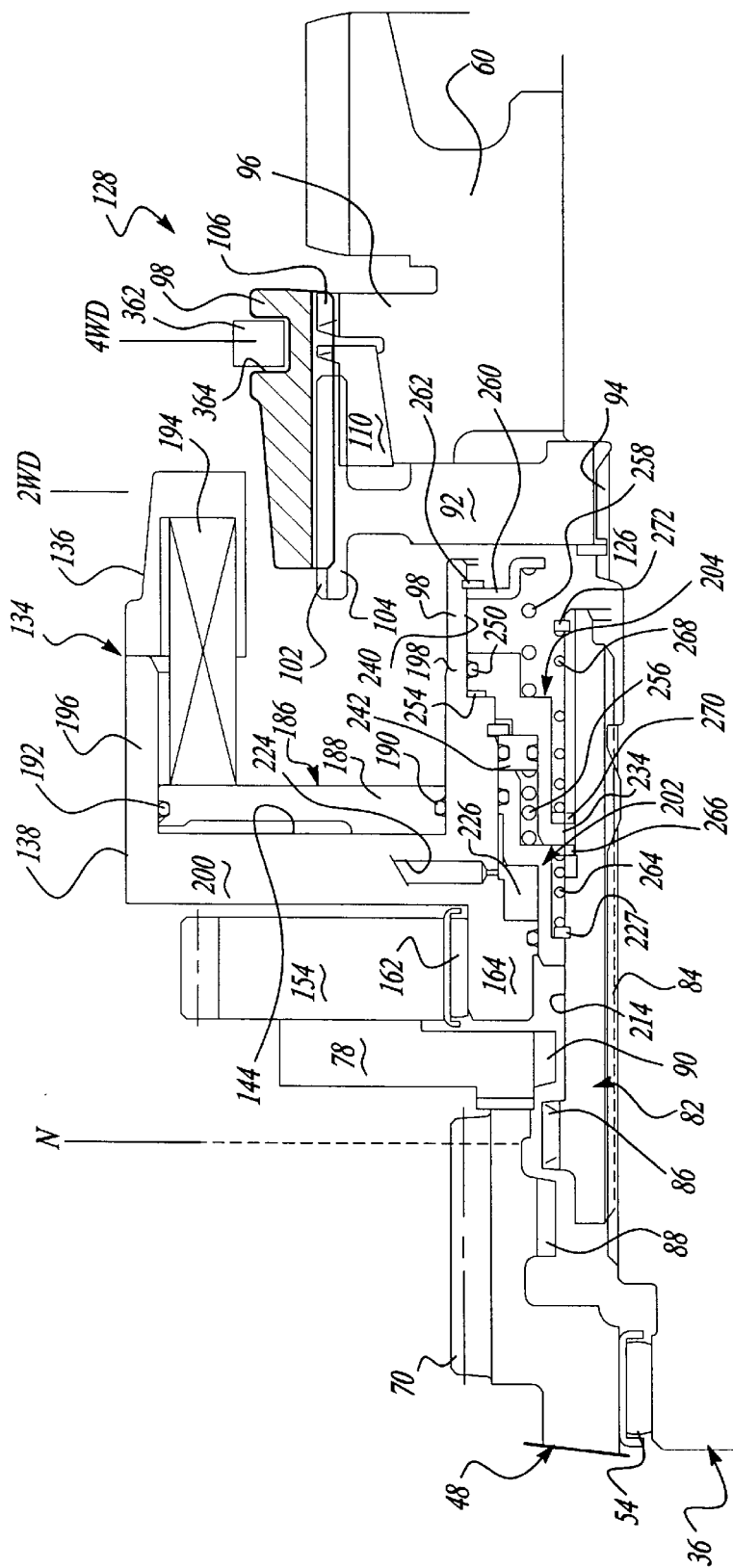
FIGS. 8a and 8b show the components of the hydraulic shift system positioned to establish a neutral mode.
Figure 9A:
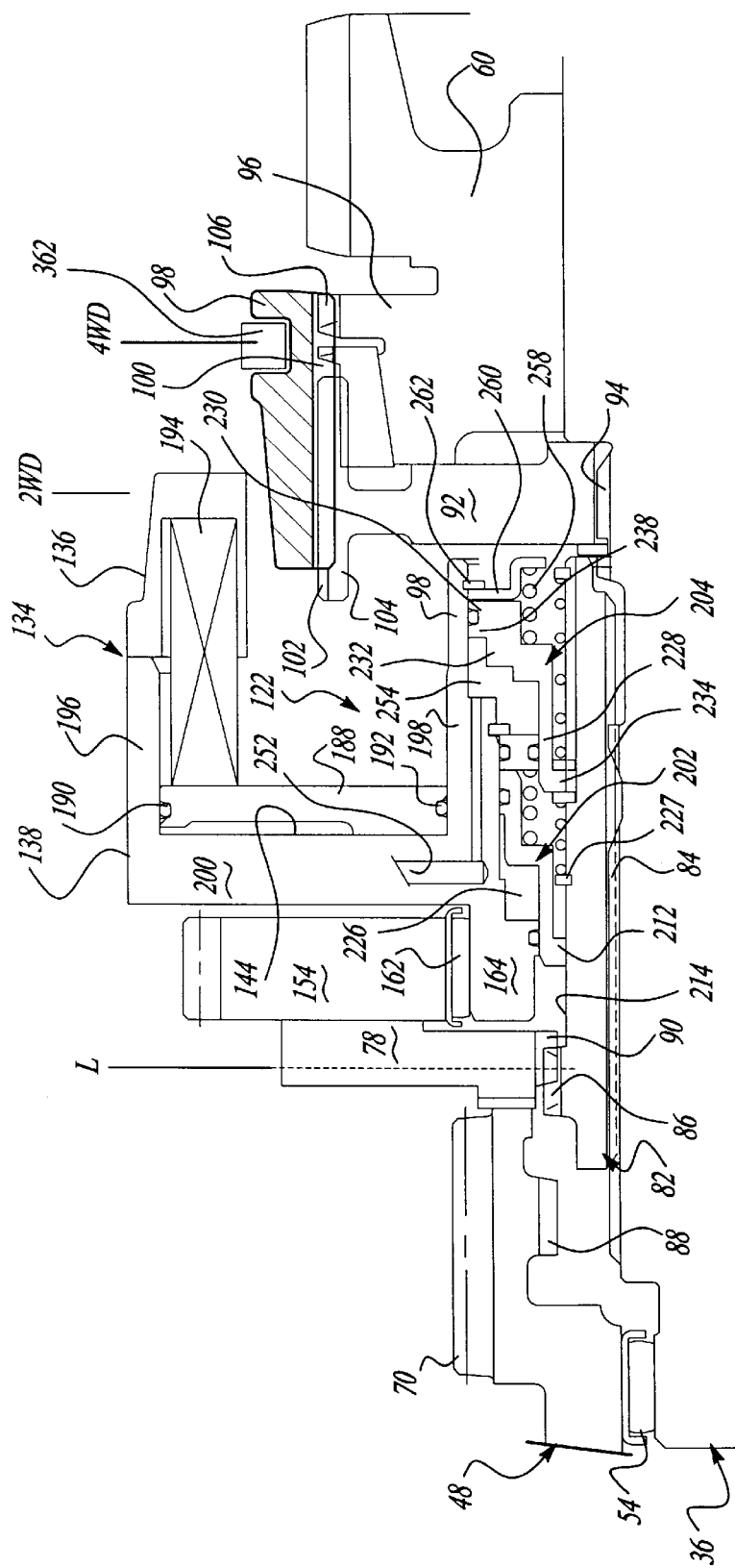
FIGS. 9a and 9b show the components of the hydraulic shift system positioned to establish a four-wheel low-range drive mode.

Transfer case 20 is shown equipped with a planetary-type gear reduction unit 66 which includes a ring gear 68 fixed to housing 46, a sun gear 70 formed integrally with input shaft 48, and a carrier assembly 72 rotatably supporting a set of pinion gears (not shown). Pinion gears mesh with both ring gear 68 and sun gear 70. Carrier assembly 72 includes a front carrier ring 76 and a rear carrier ring 78 which are suitably interconnected. Each pinion gear is rotatably supported on a pinion shaft (not shown) which extends between carrier rings 76 and 78. Thus, rotation of input shaft 48 causes carrier assembly 72 to be rotatably driven at a reduced speed ratio relative thereto. A range sleeve 82 is mounted via a splined connection 84 for rotation with rear output shaft 36 as well as for axial sliding movement thereon. As seen in FIGS. 2, 4 and 7a, range sleeve 82 is in a high-range (H) position with its clutch teeth 86 meshed with clutch teeth 88 on input shaft 48 such that range sleeve 82 couples rear output shaft 36 for common rotation with input shaft 48, thereby establishing a high-range drive mode therebetween. In FIG. 8A, range sleeve 82 is shown in a neutral (N) position with its clutch teeth 86 disengaged from clutch teeth 88 on input shaft 48 and clutch teeth 90 on rear carrier ring 78 such that rear output shaft 36 is uncoupled from input shaft 48 and carrier assembly 72, thereby establishing a neutral non-driven mode. Finally, range sleeve 82 is shown in FIG. 9A in a low-range (L) position whereat its clutch teeth 86 are meshed with clutch teeth 90 on rear carrier ring 78 such that range sleeve 82 couples rear output shaft 36 for common rotation with carrier assembly 72, thereby establishing a low-range drive mode.

Transfer case 20 is further shown to include a mode shift arrangement for selectively coupling drive sprocket 60 to rear output shaft 36. The mode shift arrangement is shown to include a hub 92 fixed via splined connection 94 for rotation with rear output shaft 36, a clutch ring 96 integrally formed on drive sprocket 60, and a mode sleeve 98 having internal spline teeth 100 in continuous meshed engagement with external spline teeth 102 formed on a cylindrical outer rim 104 of hub 92. As such, mode sleeve 98 is mounted for rotation with hub 92 as well as for axial sliding movement thereon. As seen in FIG. 4, mode sleeve 96 is in a two-wheel drive (2WD) position whereat its spline teeth 102 do not engage clutch teeth 106 formed on clutch ring 96 such that drive sprocket 58 is not coupled for rotation with rear output shaft 36, thereby establishing a two-wheel drive mode. In the two-wheel drive mode, all of the drive torque transferred by range sleeve 82 to rear output shaft 36 is delivered to rear driveline 24. In contrast, FIG. 7A shows mode sleeve 98 in a four-wheel drive (4WD) position whereat its spline teeth 102 are in meshed engagement with clutch teeth 106 on clutch ring 96 such that drive sprocket 60 is coupled for rotation with rear output shaft 36, thereby establishing a four-wheel drive mode. In the four-wheel drive mode, front output shaft 28 is rigidly coupled for rotation with rear output shaft 36.

A synchronizer assembly 108 is interposed between mode sleeve 98 and clutch ring 96 to generate speed synchronization between rear output shaft 36 and front output shaft 28 in response to movement of mode sleeve 98 from its 2WD position to its 4WD position. Synchronizer assembly 108 is shown as a single-cone arrangement including a blocker ring 110 mounted via lugs (not shown) for rotation with hub 92 and having blocker teeth 112 formed thereon. Blocker ring 110 has an internal frusto-conical surface 114 which is located against a mating external frusto-conical 116 formed on drive sprocket 60. In a well-known manner, blocker ring 110 prevents spline teeth 102 on mode sleeve 98 from passing through blocker teeth 112 until the frictional engagement between cone surfaces 114 and 116 causes drive sprocket 60 to rotate substantially synchronously with hub 92.

To provide means for moving range sleeve 82 and mode sleeve 98 between their respective positions in response to actuation of mode select mechanism 42, hydraulic shift system 44 is installed within transfer case 20. In general, hydraulic shift system 44 includes a pump 118, a pressure regulator 120, an accumulator 122, a control valve 124, a range shift assembly 126, a mode shift assembly 128, and a shift actuator 130. As will be detailed, pump 118 is operable to supply high pressure fluid to accumulator 122 which, in turn, is in fluid communication with control valve 124. Shift actuator 130 controls the flow of high pressure fluid from control valve 124 to range shift assembly 126 and mode shift assembly 128 in response to actuation of mode select mechanism 42.

Figure 3:
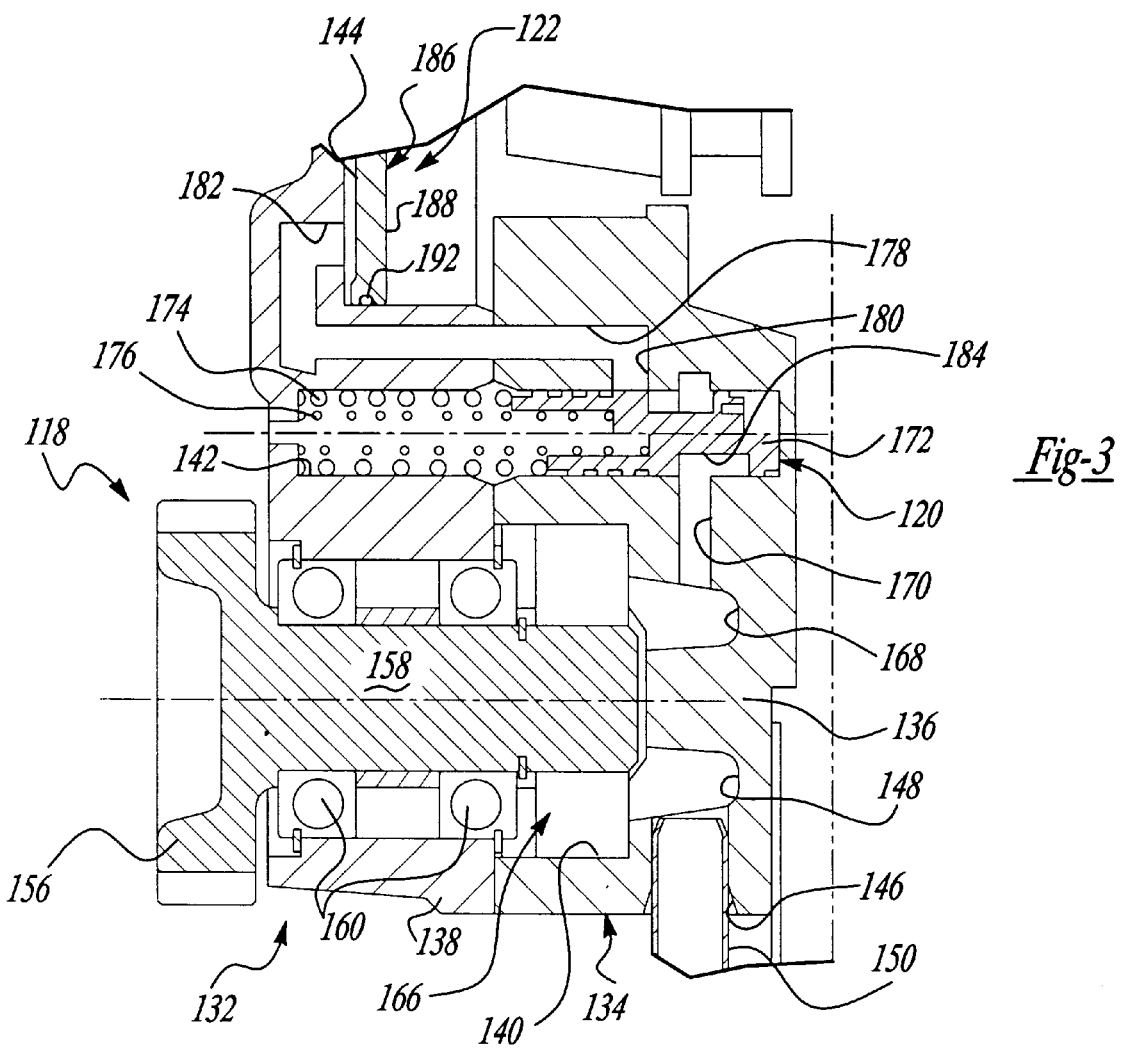
FIG. 3 is a partial sectional view of the transfer case showing a portion of the pump assembly associated with the hydraulic shift system.

According to one feature of the present invention, a pump assembly 132 is provided which integrates pump 118, pressure regulator 120, and accumulator 122 into a common assembly. Pump assembly 132 is best shown in FIGS. 2 and 3 to include a pump housing 134 mounted within housing 46 which is comprised of a pair of housing sections 136 and 138 interconnected to define a pump chamber 140, a regulator chamber 142, and an accumulator chamber 144. A inlet port 146 and an inlet chamber 148 are formed in housing section 136 which communicate with pump chamber 140. An apertured draw tube 150 has one end retained in inlet port 146 while its opposite end extends into a sump area which is filled with hydraulic fluid. A filter sleeve 152 is fitted over the portion of draw tube 150 submerged in the sump area. Pump 118 includes a drive gear 154 fixed for rotation with carrier assembly 72, and a driven gear 156 meshed with drive gear 154 and which has a stub shaft 158 rotatably supported by bearing assemblies 160 in housing section 138. Drive gear 154 is shown rotatably supported by a bearing assembly 162 on an annular collar segment 164 of housing section 138. An end of stub shaft 158 is shown to extend into pump chamber 140 and has a pump unit 166 fixed thereto. Pump unit 166 is operable to draw low pressure fluid from the sump area through filter 152, draw tube 150 and inlet chamber 148 into the suction side of pump chamber 140. Pump unit 166 discharges high pressure fluid to an outlet chamber 168 formed in housing section 136. As is evident, pump unit 166 generates a pumping action in response to rotation of carrier assembly 72 caused by rotation of input shaft 48. Pump unit 166 can be any suitable rotary-type (i.e., gerotor, etc.) gear or shaft-driven device.

With continued reference to FIGS. 2 and 3, pump outlet chamber 168 is shown to communicate with regulator chamber 142 via one or more flow passages 170. Pressure regulator 120 includes a spool valve 172 retained for sliding movement within regulator chamber 142 and a pair of coil springs 174 and 176 acting on spool valve 172. Pressure regulator 120 functions to maintain a fluid pressure of a predetermined value, hereinafter referred to as the control pressure, within accumulator chamber 144. In particular, a flow passage 178 provides a fluid communication route between an outlet port 180 of regulator chamber 142 and an inlet port 182 of accumulator chamber 144. Spool valve 172 has a circumferential groove 184 which communicates with flow passage 170. When the pressure of the fluid with accumulator chamber 144 is at the control pressure, spool valve 172 is biased by coil springs 174 and 176 to the position shown in lower one-half of FIG. 2 such that groove 184 does not communicate with outlet port 180. However, when the fluid pressure in accumulator chamber 144 is below the control pressure, the fluid pressure acting with groove 184 from the discharge side of pump unit 166 forcibly urges spool valve 172 to move, in opposition to the biasing of springs 174 and 176, to permit fluid in groove 184 to communicate with outlet port 180. Once the control pressure is restored with accumulator chamber 144, coil springs 174 and 176 force spool valve 172 to return to the position shown. While not show, a by-pass or relief valving arrangement is provided to vent or dump hydraulic fluid to the sump when pressure regulator spool valve 172 is in its closed position.

A spring-biased piston assembly 186 is retained within accumulator chamber 144 to define accumulator 122. Piston assembly 186 includes a piston plate 188, upper and lower seal rings 190 and 192, respectively, mounted to piston plate 188, and a bias spring 194 acting between housing section 136 and piston plate 188. Bias spring 194 assists in maintaining the control pressure in accumulator chamber 144 during the withdrawal of hydraulic fluid therefrom by control valve 124 or due to leakage. Accumulator chamber 144 is formed in housing section 138 between an outer rim segment 196 and an inner rim segment 198 which both axially extend from a radial plate segment 200.

To provide means for axially moving range sleeve 82 between its three distinct positions, range shift assembly 126 is shown to include a first piston 202 and a second piston 204, both of which are supported between range sleeve 82 and inner rim segment 198 of housing section 138. First piston 202 is generally bell-shaped and includes a first axial segment 206, a second axial segment 208, and a radial segment 210 therebetween. A collar segment 212 formed at the terminal end of first axial segment 206 is supported for limited sliding movement relative to an external surface 214 of range sleeve 82. A collar segment 216 formed at the terminal end of second axial segment 208 is supported for sliding movement relative to an external surface 218 of inner rim segment 198. A first seal ring 220 is provided between first axial segment 206 of first piston 202 and collar segment 164 of housing section 138. A second seal ring 222 is provided between second axial segment 208 of first piston 202 and inner rim segment 198 of housing section 138. A first supply bore 224 is provided in plate segment 200 of housing section 138 which communicates with the sealed area between first piston 202 and housing section 138 and which defines a neutral chamber 226. As will be detailed, control valve 124 can be selectively actuated to deliver hydraulic fluid from accumulator 122 to first supply bore 224 and neutral chamber 226 for moving first piston 202 from the non-actuated position shown in FIGS. 4 and 7A to the actuated position shown in FIG. 8A. Such movement of first piston 202 causes its collar segment 212 to engage a snap ring 227 fixed to range sleeve 82 for causing corresponding movement of range sleeve 82 from its H position to its N position.

Second piston 204 is generally bell-shaped and includes a first axial segment 228, a second axial segment 230, and a radial segment 232 therebetween. A collar segment 234 is formed at the terminal end of first axial segment 228 is supported for limited sliding movement relative to external surface 214 of range sleeve 82. In addition, a collar segment 238 formed at the terminal end of second axial segment 230 is supported for sliding movement relative to an external surface 240 of inner rim segment 198. A seal plate 242 is shown fixed to surface 218 of inner rim segment 198 by a snap ring 244. Seal plate 242 carries an outer seal ring 246 located adjacent to external surface 218 and an inner seal ring 248 located adjacent an outer surface of first axial segment 228 of second piston 204. In addition, a seal ring 250 is located between surface 240 of inner rim segment 198 and collar segment 238 of second piston 204. A second supply bore 252 is formed in plate segment 200 which communicates with the sealed area between inner rim segment 198, seal plate 242 and second piston 204 which together define a low-range chamber 254. As will be detailed, control valve 124 can be selectively actuated to deliver hydraulic fluid from accumulator 122 to second supply bore 252 and low-range chamber 254 for moving second piston 204 from the non-actuated position shown in FIGS. 4 and 7A to the actuated position shown in FIG. 9A. Such movement of second piston 204 causes range sleeve 82 to move from its N position to its L position.

Range shift assembly 126 is further shown to include a first return spring 256 acting between first piston 202 and seal plate 242 for normally biasing first piston 202 toward its non-actuated position. A second return spring 258 acts between second piston 204 and a retainer plate 260 fixed by a snap ring 262 to inner rim segment 198 for normally biasing second piston 204 toward its non-actuated position. In addition, a self-centering arrangement is shown to include a coil spring 264 acting between snap ring 216 and a front retention ring 266. Another coil spring 268 acts between a rear retention ring 270 and a snap ring 272 fixed to range sleeve 82. Retention rings 266 and 270 are located on opposite sides of collar segment 234 of second piston 204 and are adapted to slide with second piston 204 relative to range sleeve 82.

Figure 7B:
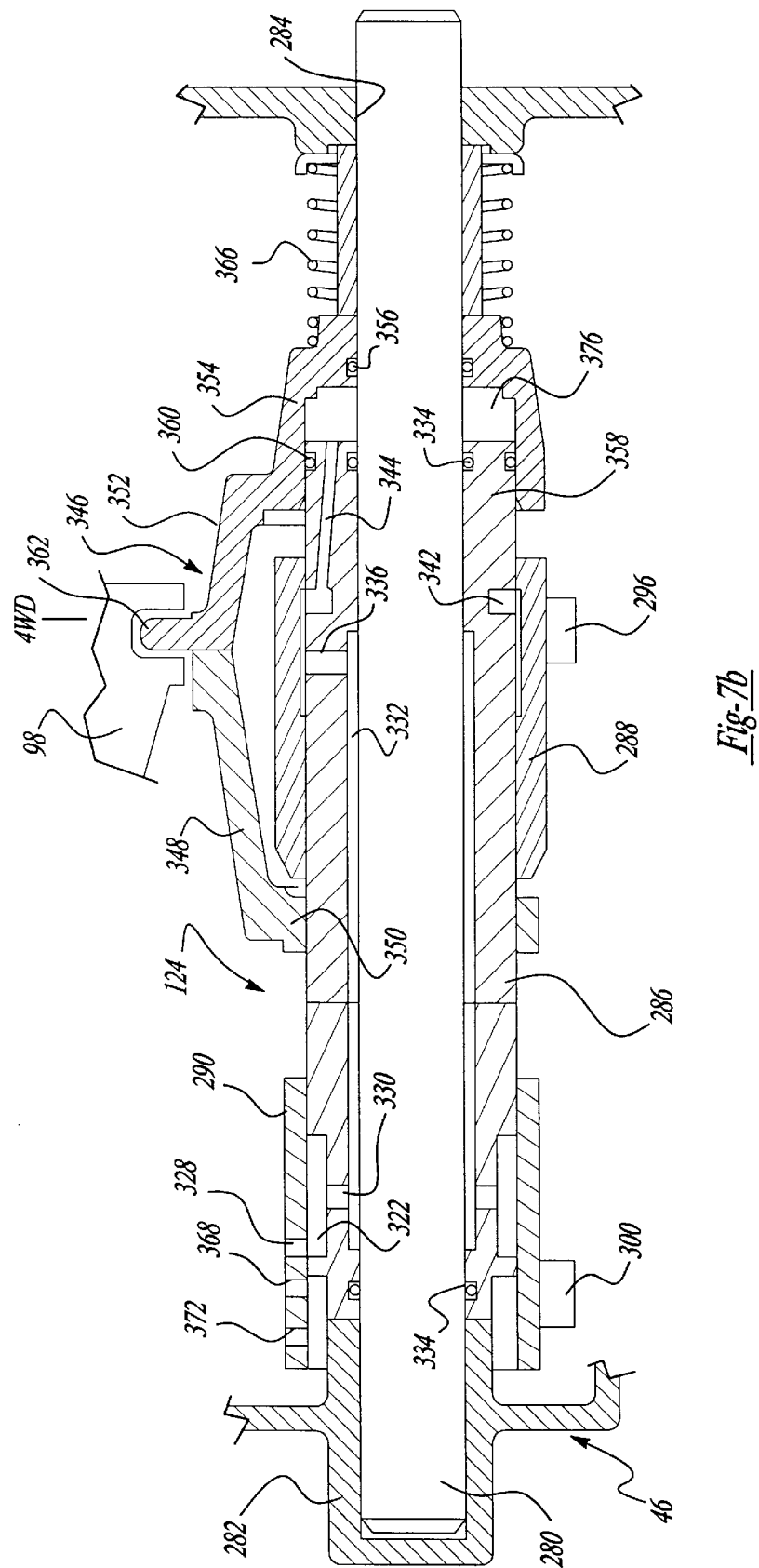
Figure 8B:
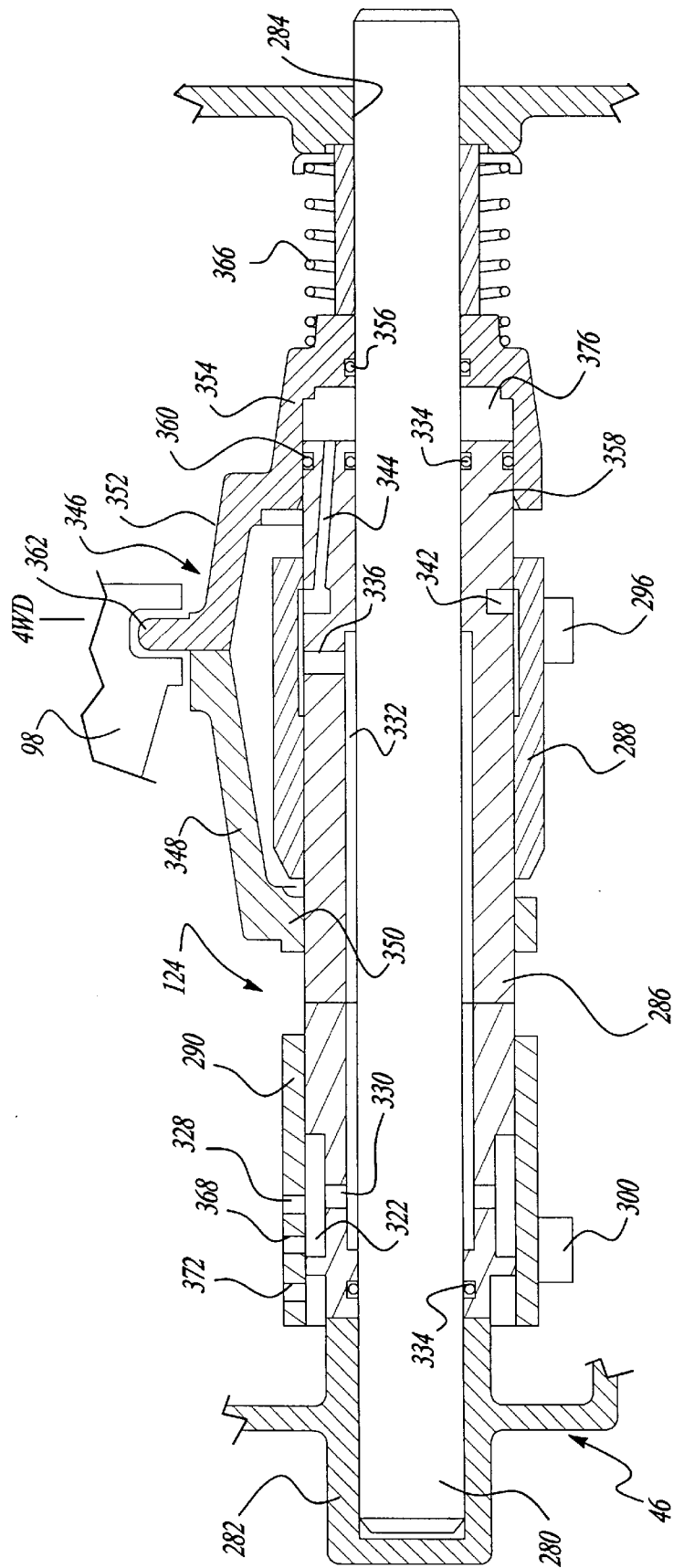
Figure 9B:
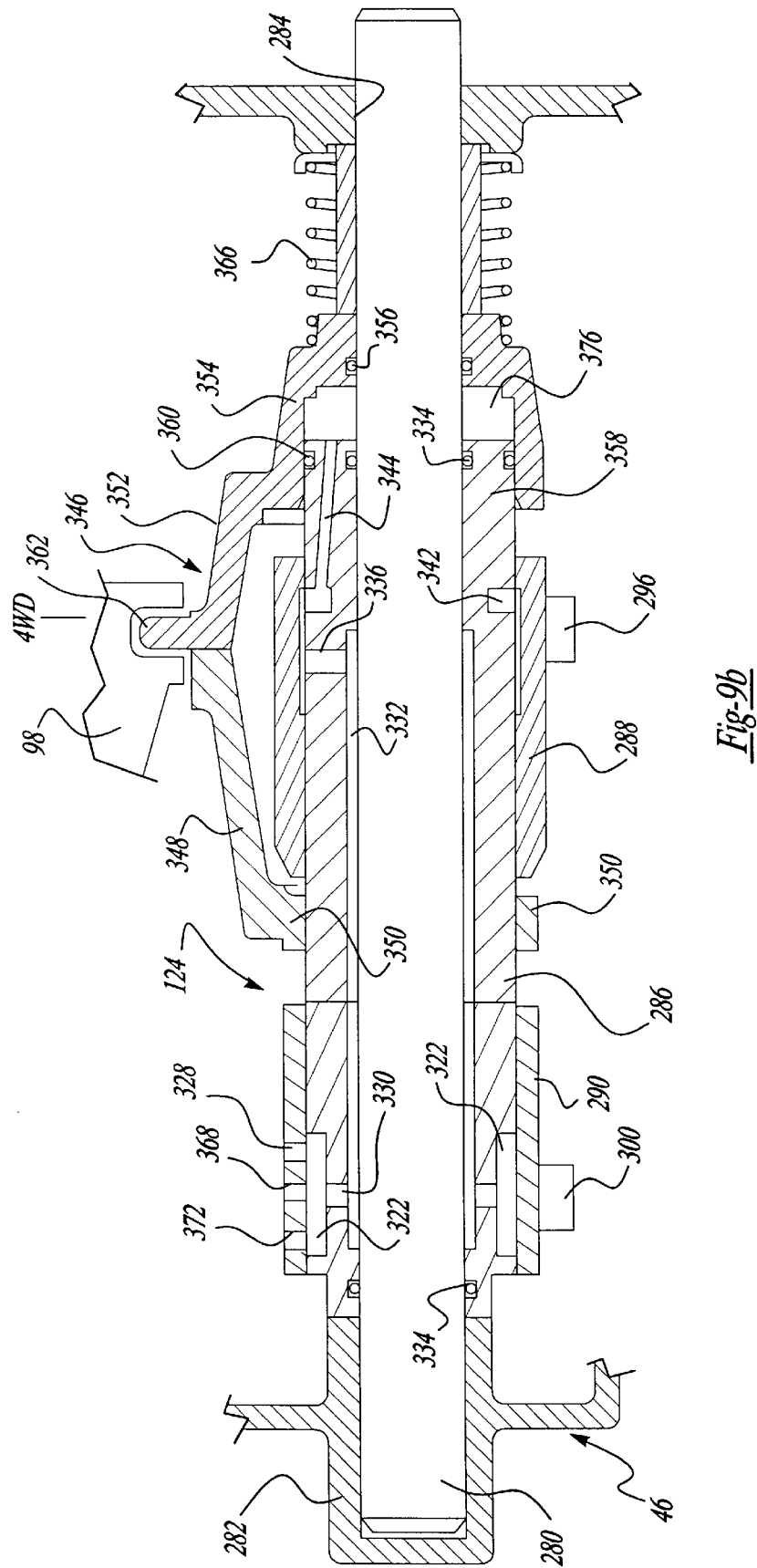

Control valve 124 is mounted on a rail 280 having its opposite ends retained in sockets 282 and 284 formed in housing 46. In general, control valve 124 includes a valve body 286 mounted on rail 280, a mode valve sleeve 288 supported for sliding movement on valve body 286, and a range valve sleeve 290 also supported for sliding movement on valve body 286. As will be detailed, mode valve sleeve 288 is movable on valve body 286 between a first position (FIG. 5) and a second position (FIG. 7B). With mode valve sleeve 288 in its first position, mode sleeve 98 is located in its 2WD position (FIG. 4). Thereafter, movement of mode valve sleeve 288 to its second position causes mode sleeve 98 to move to its 4WD position (FIG. 7A). Subsequent movement of mode valve sleeve 288 to its first position causes mode sleeve 98 to return to its 2WD position. Likewise, range valve sleeve 290 is movable relative to valve body 286 between a first position (FIG. 5), a second position (FIG. 8B), and a third position (FIG. 9B). With range valve sleeve 290 in its first position, range sleeve 82 is in its H position (FIG. 4). Movement of range valve sleeve 290 to its second position causes movement of range sleeve 82 to its N position (FIG. 8A). Finally, movement of range valve sleeve 290 to its third position causes movement of range sleeve 82 to its L position (FIG. 9A).

To provide means for moving mode valve sleeve 288 and range valve sleeve 290 between their respective positions, shift actuator 130 is shown to include a sector plate 292 mounted on an actuator shaft 294 for rotation between four distinct sector positions corresponding to the four available drive modes. The available drive modes include a two-wheel high-range drive mode, a four-wheel high-range drive mode, a neutral non-driven mode, and a four-wheel low-range drive mode. In addition, shift actuator 130 also includes a mode pin 296 fixed to mode valve sleeve 288 and which rides against an edge surface 298 of sector plate 292, and a range pin 300 fixed to range valve sleeve 290 and which is retained in a range slot 302 formed in sector plate 292. Edge surface 298 and range slot 302 are contoured to cause coordinated sliding movement of mode valve sleeve 288 and range valve sleeve 290 between their respective positions in response to rotation of sector plate 292. To this end, edge surface 298 is defined by a cam surface 304 and a dwell surface 306 while range slot 302 is defined by a dwell slot segment 308 and a cam slot segment 310.

Figure 6:
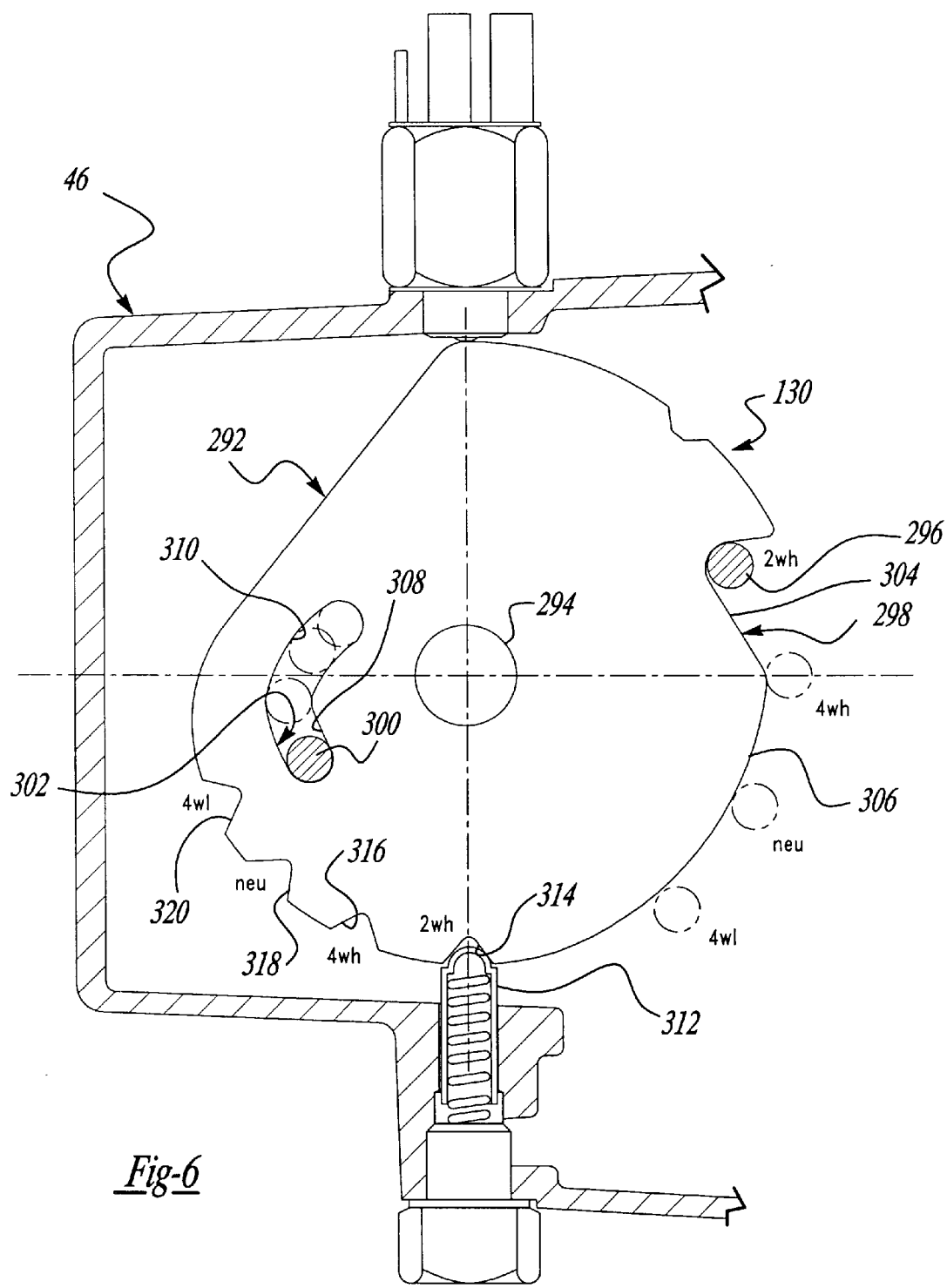
FIG. 6 is a partial sectional view showing the shift actuator components in greater detail.

With continued reference to FIG. 6, sector plate 292 is shown with a spring-biased poppet 312 located in a 2wh detent 314. In this sector position, mode pin 296 engages one end of cam surfaces 304 for locating mode valve sleeve 288 in its first position while range pin 300 engages a first end of dwell slot segment 308 for locating range valve sleeve 290 in its first position. Thus, mode sleeve 98 is in its 2WD position and range sleeve 82 is in its H position for establishing the two-wheel high-range drive mode. Counterclockwise rotation of sector plate 292 until poppet 312 is located in a 4wh detent 316 causes axial movement of mode pin 296 due to the contour of cam surface 304 for moving mode valve sleeve 288 to its second position while the contour of dwell slot segment 308 maintains range valve sleeve 290 in its first position. Thus, mode sleeve 98 is moved to its 4WD position and range sleeve 82 is maintained in its H position for establishing the four-wheel high-range drive mode. Continued counterclockwise rotation of sector plate 292 until poppet 312 engages a Neu detent 318 causes mode pin 296 to exit cam surface 304 and ride on dwell surface 306 for maintaining mode valve sleeve 288 in its second position while range pin 300 rides in cam slot segment 310 of range slot 302 which causes axial movement of range valve sleeve 290 to its second position. As such, mode sleeve 98 is maintained in its 4WD position and range sleeve 82 is moved to its N position for establishing the neutral non-driven mode. Finally, further rotation of sector plate 292 to a position locating poppet 312 in a 4wl detent 320 causes mode pin 296 to continue to ride on dwell surface 306 for maintaining mode valve sleeve 288 in its second position while range pin 200 rides in cam slot segment 310 of range slot 302 which causes axial movement of range valve sleeve 290 to its third position. As such, mode sleeve 98 is maintained in its 4WD position while range sleeve 82 is moved to its L position for establishing the four-wheel low-range drive mode.

Figure 5:
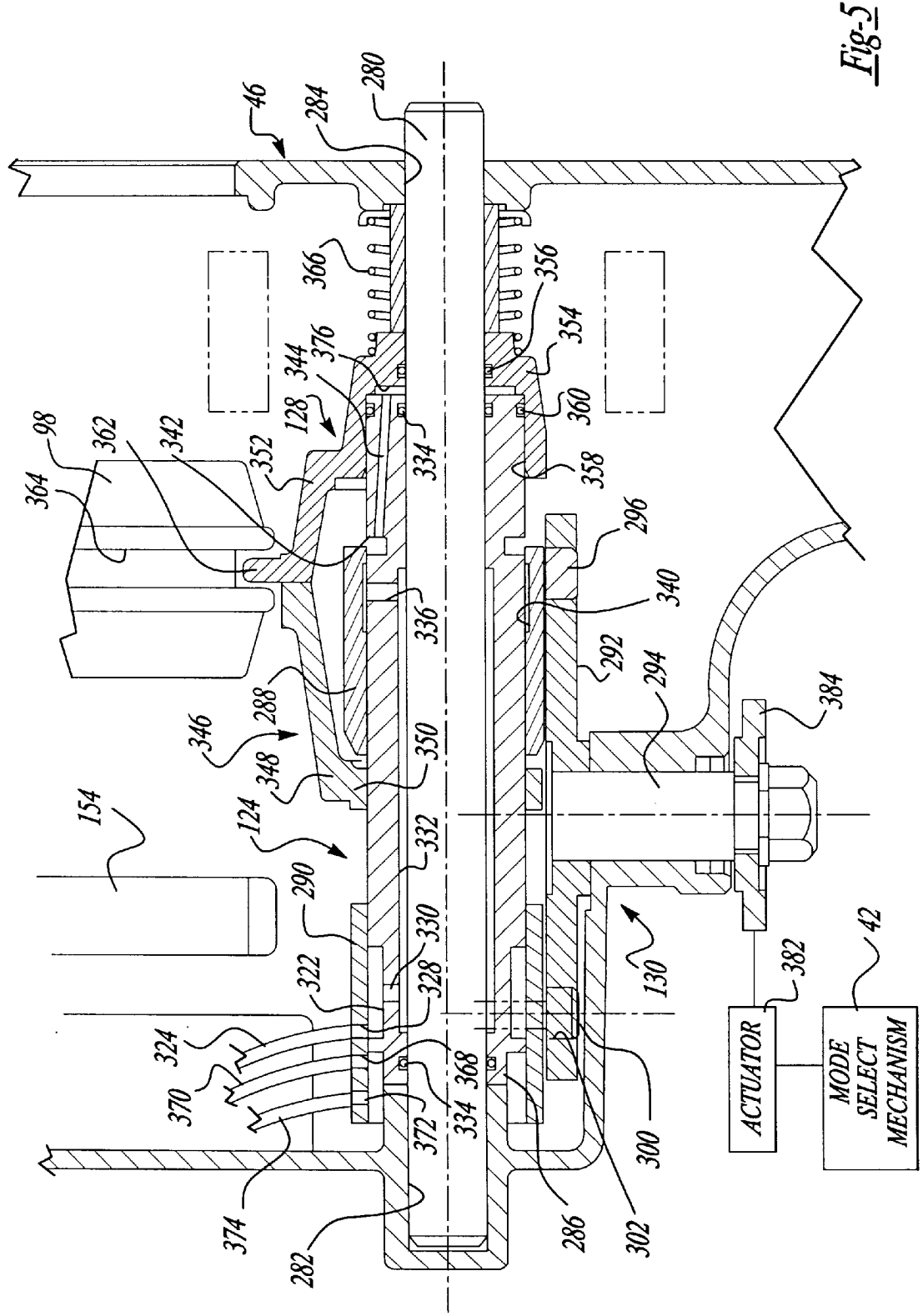
FIG. 5 is a partial sectional view of the transfer case showing the hydraulic control valve with its valve components positioned to establish the two-wheel high-range drive mode.

Referring to FIG. 5, the components of control valve 124 will now be described in greater detail. Specifically, valve body 286 includes a circumferential pressure groove 322 which is in fluid communication with accumulator 122 via a supply line 324 extending between an outlet port of accumulator chamber 144 and an inlet port 328 formed through range valve sleeve 290. Valve body 286 includes a series of radial bores 330 which transfer hydraulic fluid from pressure groove 322 to a circumferential supply groove 332 formed in valve body 286 adjacent to rail 280. Front and rear seal rings 334 are provided for sealing valve body 286 relative to rail 280 on opposite sides of supply groove 332. Additionally, radial bores 336 provide a fluid route from supply groove 332 to a recessed chamber 340 formed in mode valve sleeve 288. Valve body 286 is shown to further include a circumferential slot 342 which communicates with a through bore 344. Mode shift assembly 128 generally includes a third piston for moving mode sleeve in response to pressurized fluid applied thereto. In particular, mode shift assembly 128 includes a shift fork assembly 346 having a first fork member 348 with a collar segment 350 slidingly supported on valve body 286 between valve sleeves 288 and 290, and a second fork member 352 having a collar segment 354 slidingly supported on rail 280 and sealed thereto via a seal ring 356. Second fork member 352 defines a cylindrical cavity 358 within which the rear end of valve body 286 is retained and sealed relative thereto via a seal ring 360. A fork segment 362 of second fork member 352 is retained in a groove 364 formed in mode sleeve 98. A coil spring 366 acts between housing 46 and collar segment 354 for normally biasing shift fork assembly 346 to the position shown in FIG. 5 which causes mode sleeve 98 to be positioned in its 2WD position. Thus, coil spring 366 acts as a fail-safe in case the hydraulic system fails. Range valve sleeve 290 also includes a first outlet port 368 which is in fluid communication with first supply bore 244 via a neutral supply line 370, and a second outlet port 372 which is in fluid communication with second supply bore 252 via a low-range supply line 374.

Referring to FIGS. 4 and 5, the components are shown positioned to establish the two-wheel high-range drive mode. Specifically, range valve sleeve 290 is in its first position and mode valve sleeve 288 is in its first position. As such, outlet ports 368 and 372 do not communicate with pressure groove 322 such that return coil springs 256 and 258 urge first piston 202 and second piston 204 to their respective non-actuated positions while venting fluid in neutral chamber 226 and low-range chamber 254 to the sump. Additionally, coil springs 264 and 268 assist in urging range sleeve 82 to return to its H position. Moreover, since mode valve sleeve 288 is located in its first position, pressurized fluid in chamber 340 is not delivered through slot 342 and bore 344 to a pressure chamber 376 formed in shift fork assembly 346. Thus, coil spring 366 urges shift fork assembly 346 toward valve body 286 for venting chamber 376 to the sump and locating mode sleeve 98 in its 2WD position.

When it is desired to shift transfer case 20 from its two-wheel high-range drive mode into its four-wheel high-range drive mode, sector plate 292 is rotated from its 2wh sector position to its 4wh sector position which moves mode valve sleeve 288 to its second position while maintaining range valve sleeve 290 in its first position. With mode valve sleeve 288 in its second position, chamber 340 communicates with slot 342 for delivering high pressure fluid to pressure chamber 376. Expansion of chamber 376 due to the high pressure fluid delivered thereto causes movement of shift fork assembly 346 and mode sleeve 98, in opposition to the biasing of spring 366, from its 2WD position to its 4WD position. Since range valve sleeve 290 is maintained in its first position, outlet ports 368 and 372 do not communicate with pressure groove 332 and range sleeve 82 is held in its H position.

When it is desired to shift transfer case 20 out of its four-wheel high-range drive mode and into its neutral mode, sector plate 292 is rotated to its Neu sector position which moves range valve sleeve 290 to its second position while maintaining mode valve sleeve 288 in its second position. With range valve sleeve 290 in its second position, outlet port 368 is placed in fluid communication with pressure groove 322 for supplying hydraulic pressure through neutral supply line 370 and supply bore 224 to neutral chamber 226. As such, first piston 202 is forcibly slid rearwardly, in opposition to first return spring 256, from its non-actuated position shown in FIG. 7A to its actuated position shown in FIG. 8A. Such movement of first piston 202 causes its collar segment 212 to engage snap ring 227 and move range sleeve 82 to its N position. Moreover, second return spring 258 holds second piston 204 in its non-actuated position such that movement of first piston 202 causes coil spring 264 to be compressed between snap ring 227 and retention ring 266.

When it is desired to shift transfer case 20 out of its neutral mode and into its four-wheel low-range drive mode, sector plate 292 is rotated to its 4wl sector position for moving range valve sleeve 290 to its third position while maintaining mode valve sleeve 288 in its second position. With range valve sleeve 290 in its third position, both outlet ports 368 and 372 are placed in communication with pressure groove 322. Thus, the supply of hydraulic pressure through neutral supply line 370 and supply bore 224 to neutral chamber 226 is maintained while hydraulic pressure is additionally supplied through low-range supply line 374 and second supply bore 252 to low-range chamber 254. Thus, first piston 202 is maintained in its actuated position and second piston 204 is moved to its actuated position in opposition to second return spring 258. This movement permits coil spring 264 to expand while compressing coil spring 268. However, since coil spring 268 acts against snap ring 272, it causes range sleeve 82 to move to its L position. Note that movement of range sleeve 82 from its N position to its L position causes collar segment 212 to slide on external surface 214.

To return transfer case 20 from its four-wheel low-range drive mode to its two-wheel high-range drive mode, sector plate 292 is rotated in a clockwise direction for causing movement of mode valve sleeve 288 and range valve sleeve 290 in a sequence which is simply reversed to that described above. As such, when range valve sleeve 290 is moved to its second position, the supply of hydraulic pressure is interrupted to low-range chamber 254 and second piston 204 is forced to its non-actuated position by return spring 258 which vents low-range chamber 254. Likewise, interruption of the supply of hydraulic pressure to neutral chamber 226 due to movement of range valve sleeve 290 to its first position causes return spring 256 to forcibly urge first piston 202 to move to its non-actuated position while venting neutral chamber 226 to the sump. Finally, interruption of the supply of hydraulic pressure to chamber 376 due to movement of mode valve sleeve 288 from its second position to its first position causes spring 366 to move shift fork assembly 346 which, in turn, moves mode sleeve 98 to its 2WD position.

Referring again to FIG. 5, mode select mechanism 42 is shown diagrammatically connected by an actuator 382 to a lever arm 384 fixed to actuator shaft 294. In one arrangement, mode select mechanism 42 is a gearshift lever and actuator is a linkage assembly connecting the gearshift lever to lever arm 384. Thus, the gearshift lever is movable between four distinct positions, with such movement transferred via the linkage to cause corresponding rotation of lever arm 384, actuator shaft 294 and sector plate 292. In this arrangement, the "tactile" shift feel or shift resistance experienced by the vehicle operator when shifting gearshift lever 380 is not related to the mechanical forces required to move range sleeve 82 and mode sleeve 98. Rather, the shift feel is provided by the detent and poppet arrangement which can be designed to provide a variety of different tactile outputs, or eliminated entirely. Additionally, since movement of range sleeve 82 and mode sleeve 98 is controlled by hydraulic pressure, the particular values for the control pressure, flow rates and other parameters can be selected to optimize each particular transfer case application. As a further alternative, mode select mechanism 42 can be a switch (i.e., a pushbutton or a rotary lever) which is electrically connected to actuator 382 which, in this case, would be a power-operated device, such as a gearmotor/encoder assembly. Preferably, the output of the gearmotor/encoder assembly is directly connected to actuator shaft 294. Thus, selection of a desired mode via the switch sends a signal to the gear motor/encoder assembly for rotating actuator shaft 294 and sector plate 292 to the particular sector position which corresponds to the drive mode selected. In a full-time transfer case where the 2WD/4WD mode shift arrangement is substituted with an interaxle differential, mode shift assembly 128 can be used as a differential lock-out device operable in a first position to permit unrestricted speed differentiation between rear output shaft 36 and front output shaft 28 and in a second position to prevent such differentiation therebetween.

Figure 10:
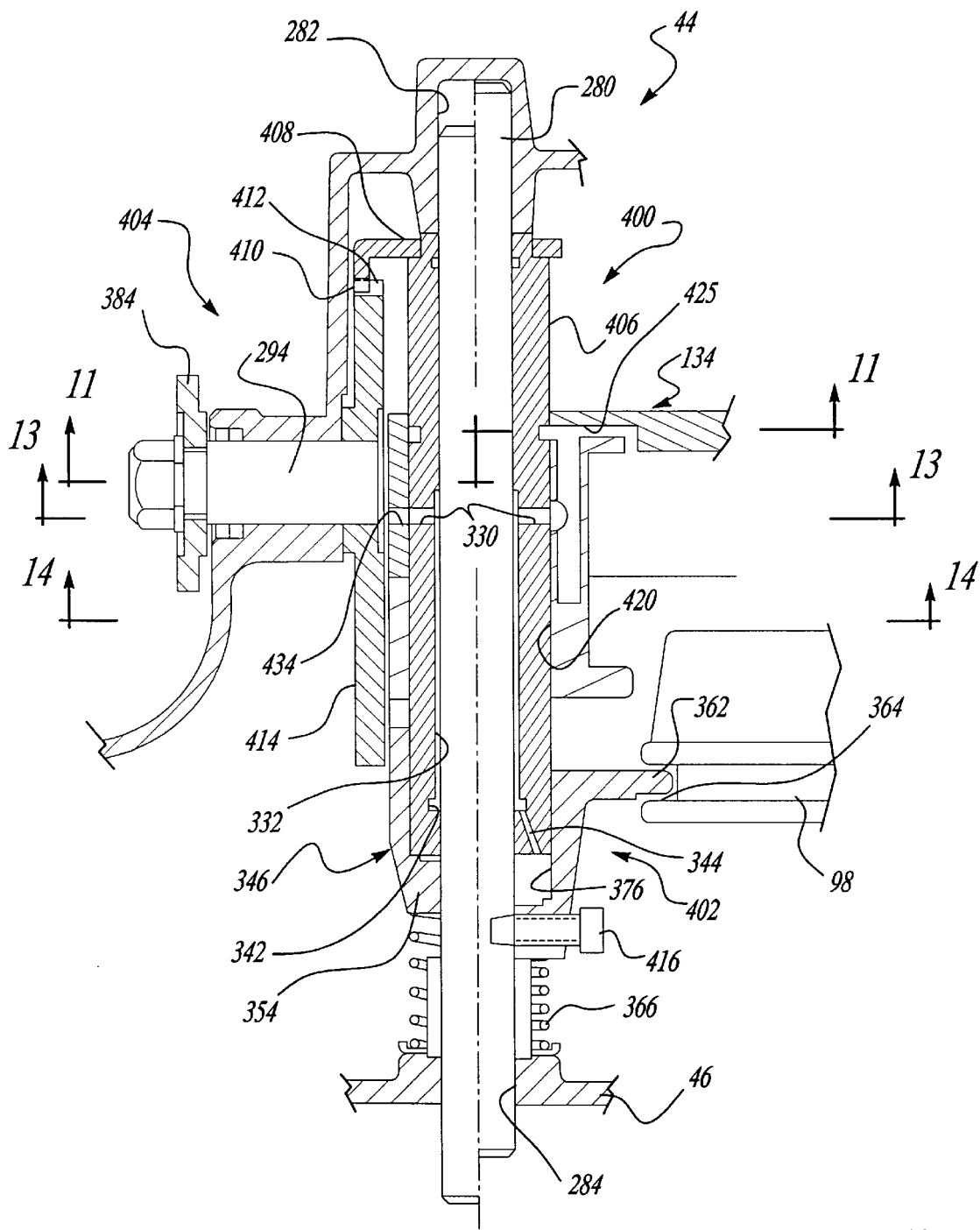
FIG. 10 is a partial sectional view of an alternative embodiment for the hydraulic control valve associated with the hydraulic shift system of the present invention.
Figure 11:
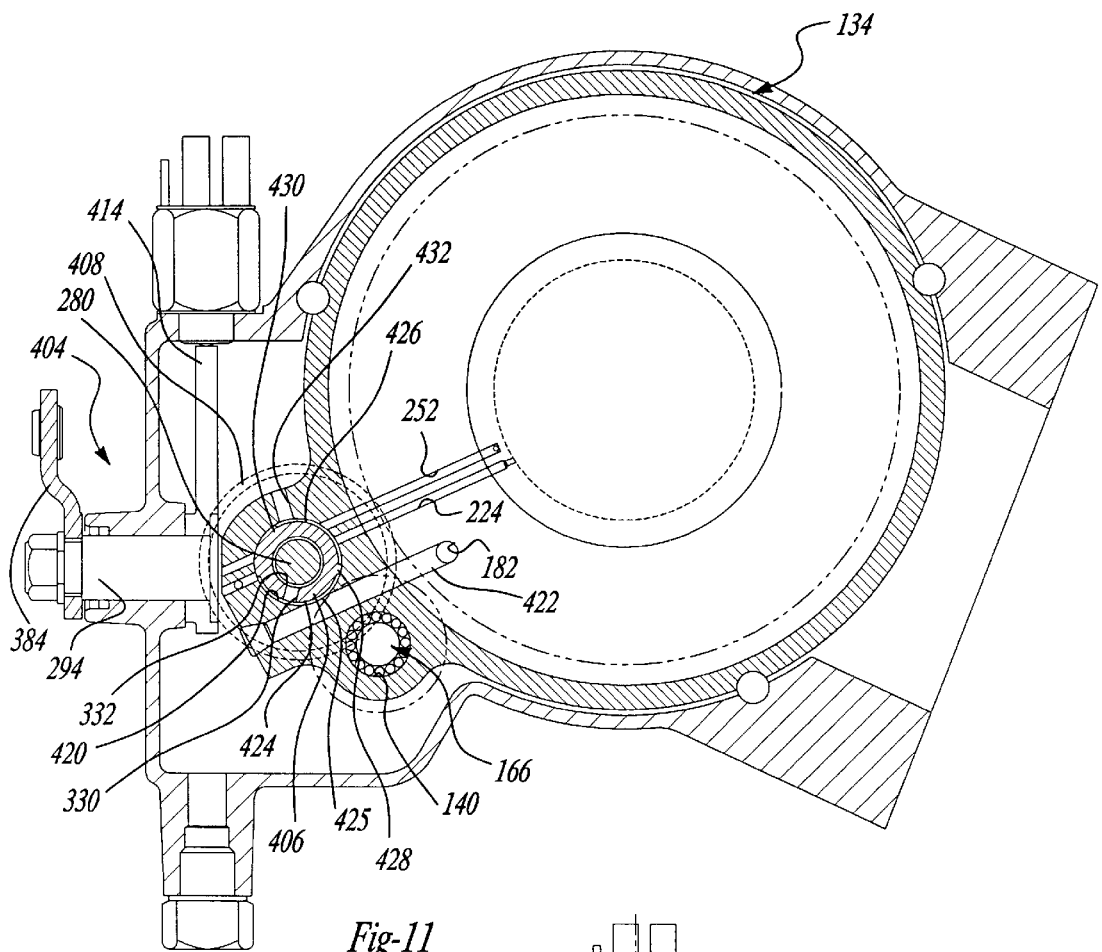
FIG. 11 is a sectional view taken generally along line 11—11 of FIG. 10.
Figure 12:
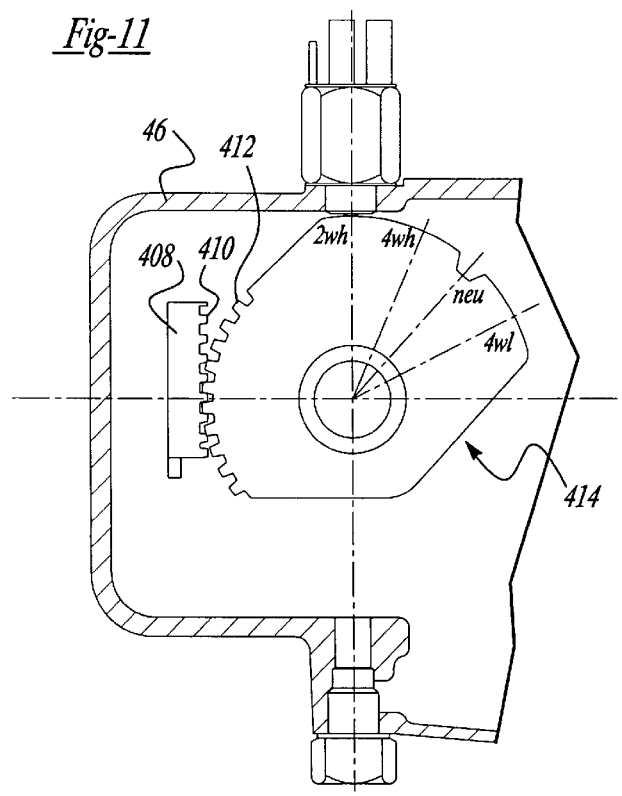
FIG. 12 is a view showing the shift actuator associated with the control valve shown in FIG. 10.

Referring now to FIGS. 10 through 14, an alternative arrangement is shown for use with hydraulic shift system 44 and which includes various components that have been modified in construction but which are still readily applicable for use in transfer case 20. In particular, FIG. 10 illustrates a rotary-type control valve 400 operable for providing fluid communication between range shift assembly 126 and a mode shift assembly 402 via a shift actuator 404. Shift actuator 404 controls the flow of high pressure fluid from control valve 400 to range shift assembly 126 and mode shift assembly 402 in response to actuation of mode select mechanism 42. Mode shift assembly 402 is generally similar to mode shift assembly 128 with the exception that fork assembly 346 can be fixed to shaft 280 via pin 416 such that shaft 280 slides axially in response to movement of fork assembly 346. Control valve 400 is shown mounted on rail 280 with its opposite end retained in sockets 282 and 284 formed in housing 46. In general, control valve 400 is a rotary-type valve having a valve body 406 supported on rail 280 for rotation relative thereto. Shift actuator 404 includes a gear rack 408 fixed to valve body 406 with its teeth 410 meshed with sector teeth 412 formed on a sector plate 414 which is mounted on actuator shaft 294 for rotation between four distinct sector positions corresponding to the four available drive modes. Thus, rotation of actuator shaft 294 causes corresponding rotation of sector plate 414 which, in turn, causes rotation of valve body 406 for selectively opening and closing fluid communication passways between accumulator 122 and range shift assembly 126 and mode shift assembly 402. Since many components shown in FIGS. 10–14 are similar in construction and/or function to those components previously disclosed, like reference numerals are hereinafter used.

Pump housing 134 defines a cylindrical valve chamber 420 within which valve body 406 is retained for rotary movement. A supply bore 422 is formed in pump housing 134 which communicates with outlet passage 170 of pump chamber 140 for supplying pressure to accumulator 122 via inlet port 182 and to valve chamber 420 via inlet port 425. Moreover, first supply bore 224 is shown to extend between valve chamber 420 and neutral chamber 226 while second supply bore 252 is shown to extend between valve chamber 420 and low-range chamber 254.

Figure 13:
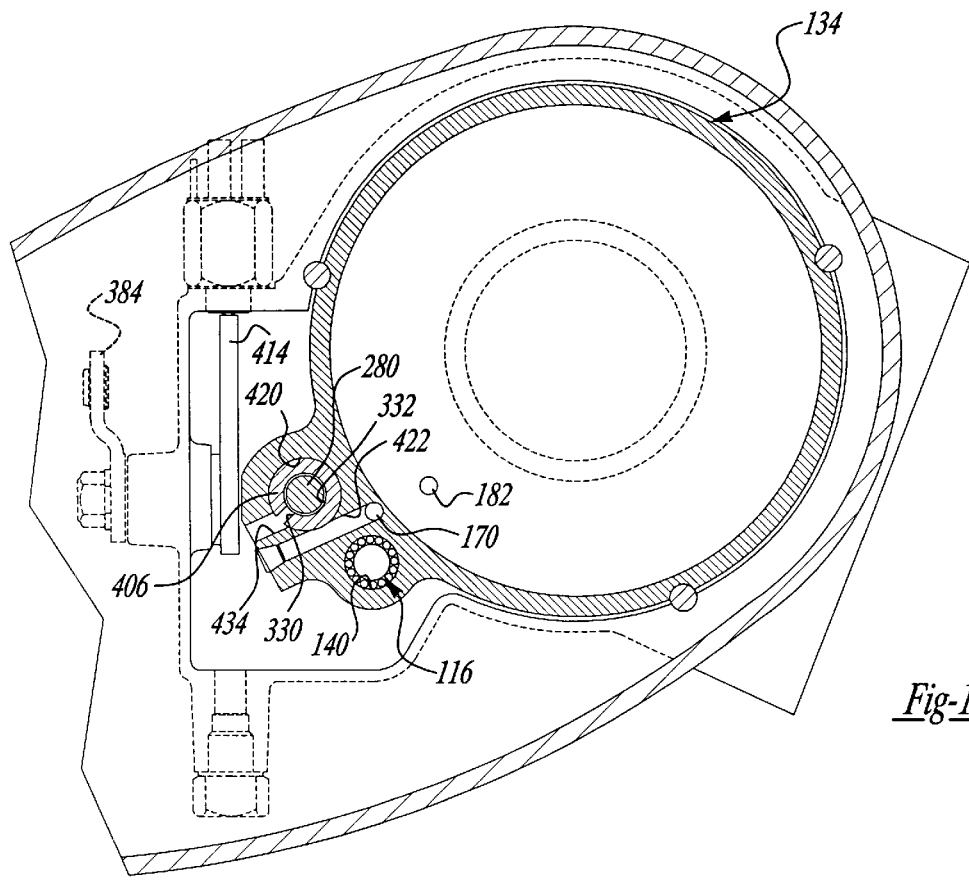
FIG. 13 is a view taken generally along line 13—13 of FIG. 10.
Figure 14:
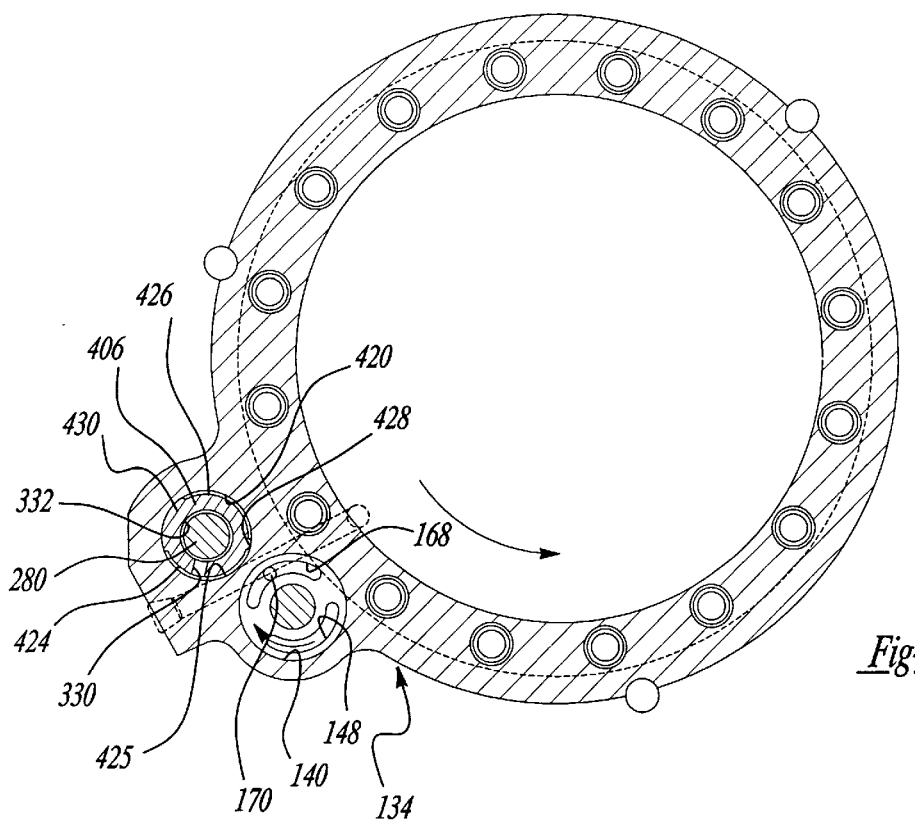
FIG. 14 is a view taken generally along line 14—14 of FIG. 10.

Valve body 406 includes a pressure groove 424 and a vent groove 426 formed in its external surface and which are separated by a small lug 428 and a large lug 430. With valve body 406 in its first valve position, shown in FIGS. 10 through 14, the two-wheel high-range drive mode is established with range sleeve 82 in its high-range (H) position and mode sleeve 98 in its two-wheel drive (2WD) position. In particular, sector plate 414 is located in its 2wh sector position which, due to its teeth 412 engaging teeth 410 of rack 408 fixed to valve body 406, locates valve body 406 in the first valve position. As such, range sleeve 82 is located in its H position since, with valve body 406 in its first valve position, low-range supply bore 252 and high-range supply bore 224 both communicate with vent groove 426 which, in turn, is in communication with a vent port 432 to sump. Thus, as previously described, range sleeve 82 is biased by the springs associated with first piston 202 and second piston 204 to its H position. Likewise, mode sleeve 98 is in its 2WD position because chamber 376 is vented to sump via through bore 344, slot 342, supply groove 332, radial ports 330 and a vent port 434 (FIG. 13). Thus, spring 366 biases fork assembly 346 and mode sleeve 98 to its 2WD position. For clarity, the left half of FIG. 10 shows fork assembly 346' positioned to locate mode sleeve 98 in its 2WD position while the right half thereof shows mode sleeve 98 in its 4WD position.

Counterclockwise rotation of sector plate 414 from its 2wh sector position to its 4wh sector position, via rotation of actuator shaft 294, causes rotation of valve body 406 in a first direction (i.e., counterclockwise in FIGS. 11, 13 and 14) to a second valve position whereat radial port 330 no longer communicates with vent port 434 such that hydraulic pressure is delivered to chamber 376 through ports 330, supply groove 332, slot 342 and through bore 344. However, such rotation of valve body 406 to its second valve position still maintains vent groove 426 in communication with supply bores 224 and 252 and vent port 432 so as to maintain range sleeve 82 in its H position.

When sector plate 414 is rotated from its 4wh sector position to its Neu position, valve body 406 is rotated in the first direction to a third valve position whereat small lug 428 is located between supply bores 224 and 252. In this third valve position, pressure groove 424 is placed in communication with neutral supply bore 224 for delivering hydraulic fluid to neutral chamber 226 for moving first piston 202 to its actuated position and range sleeve 82 to its N position. In this third position of valve body 406, hydraulic pressure is still delivered to chamber 376 of shift fork assembly 346 such that mode sleeve 98 is maintained in its 4WD position. Moreover, low-range supply bore 252 does not communicate with pressure groove 424 such that second piston 204 is retained in its non-actuated position.

When it is desired to establish the four-wheel low-range drive mode, sector plate 414 is rotated to its 4wl sector position which causes valve body 406 to rotate in the first direction to a fourth valve position. In the fourth valve position, small lug 428 is located between low-range supply bore 252 and vent port 432. As such, pressure groove 424 communicates with low-range supply bore 252 in addition to neutral bore 224 for causing second piston 204 to move to its actuated position, thereby moving range sleeve 82 to its L position. During movement of valve body 406 to its fourth valve position, hydraulic fluid is still delivered to chamber 376 to maintain mode sleeve 98 in its 4WD position. As is obvious, clockwise rotation of sector plate 414 from its 4wl sector position sequentially through the other sector positions causes movement of valve body 406 from its fourth valve position sequentially through its other positions to establish the corresponding drive modes. Actuator shaft 294 can again be rotated either manually or with a power-operated actuator.

Referring now to FIGS. 15–21, another alternative arrangement for a control valve 500 is shown for use with hydraulic shift system 44 and which functions to selectively supply hydraulic fluid to range shift assembly 126 and mode shift assembly 502 in response to actuation of a shift actuator 504 via mode select mechanism 42. In particular, control valve 500 is a rotary-type valve having a valve body 506 supported on rail 280' for rotation relative thereto. Shift actuator 504 includes a cam plate 508 fixed to valve body 506 and having a lug 510 retained in a cam slot 512 formed in a sector plate 514 mounted on actuator shaft 294 for rotation between four distinct sector positions corresponding to the four available drive modes. As such, rotation of actuator shaft 294 via mode select mechanism 42 causes corresponding rotation of sector plate 514 which, in turn, causes corresponding rotation of valve body 506. Such rotation of valve body 506 functions to selectively open and close various fluid pathways for supplying and/or venting hydraulic fluid to and from neutral chamber 226, low-range chamber 254 and mode chamber 376. Again, those components that are generally similar in construction and/or function to those previously disclosed are hereinafter identified by like reference numerals.

Figure 16:
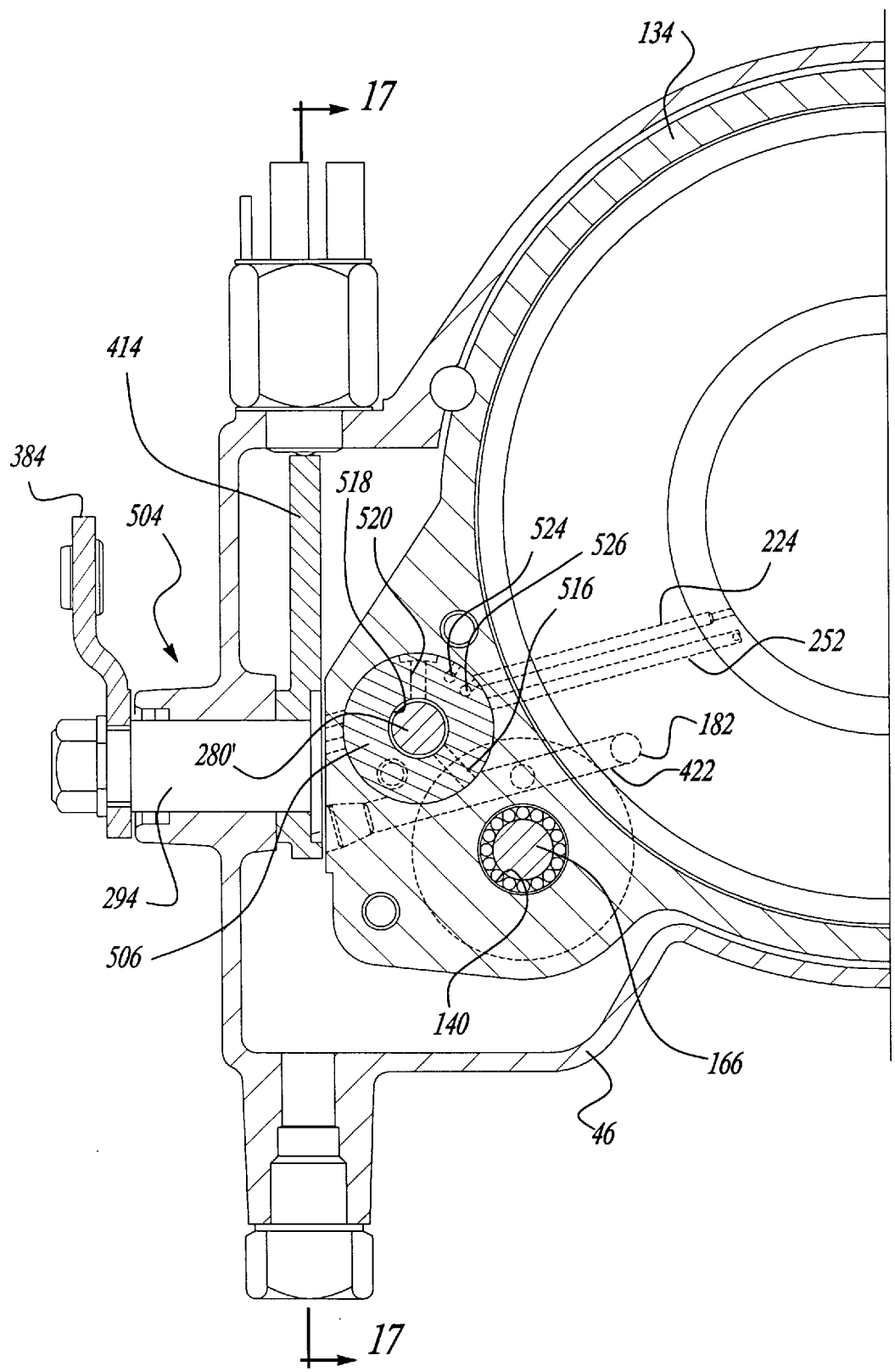
FIG. 16 is a partial sectional view taken generally along the line 16—16 of FIG. 15.
Figure 17:
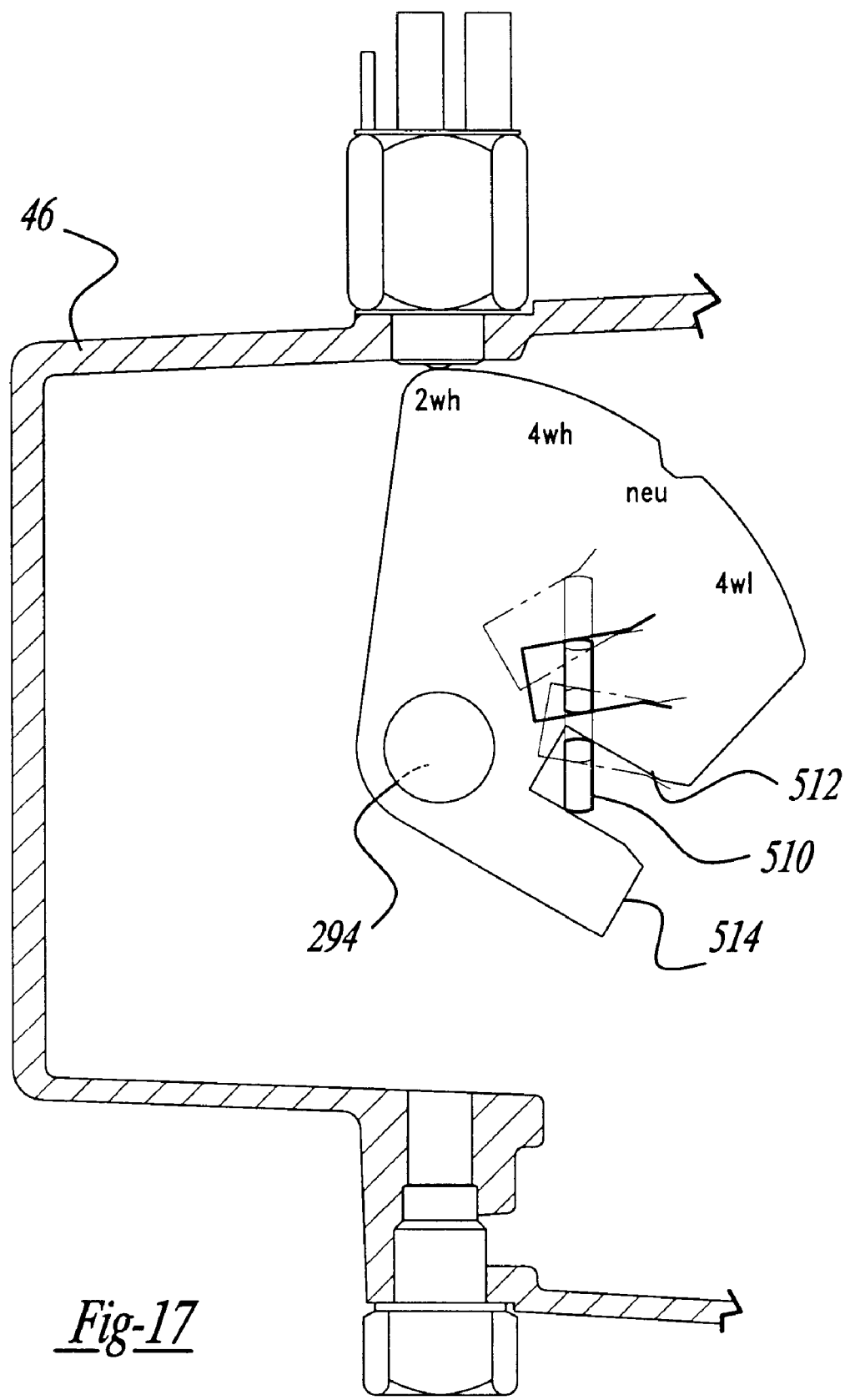
FIG. 17 is a partial sectional view showing a shift actuator associated with the control valve taken generally along the line 17—17 of FIG. 16.
Figure 18:
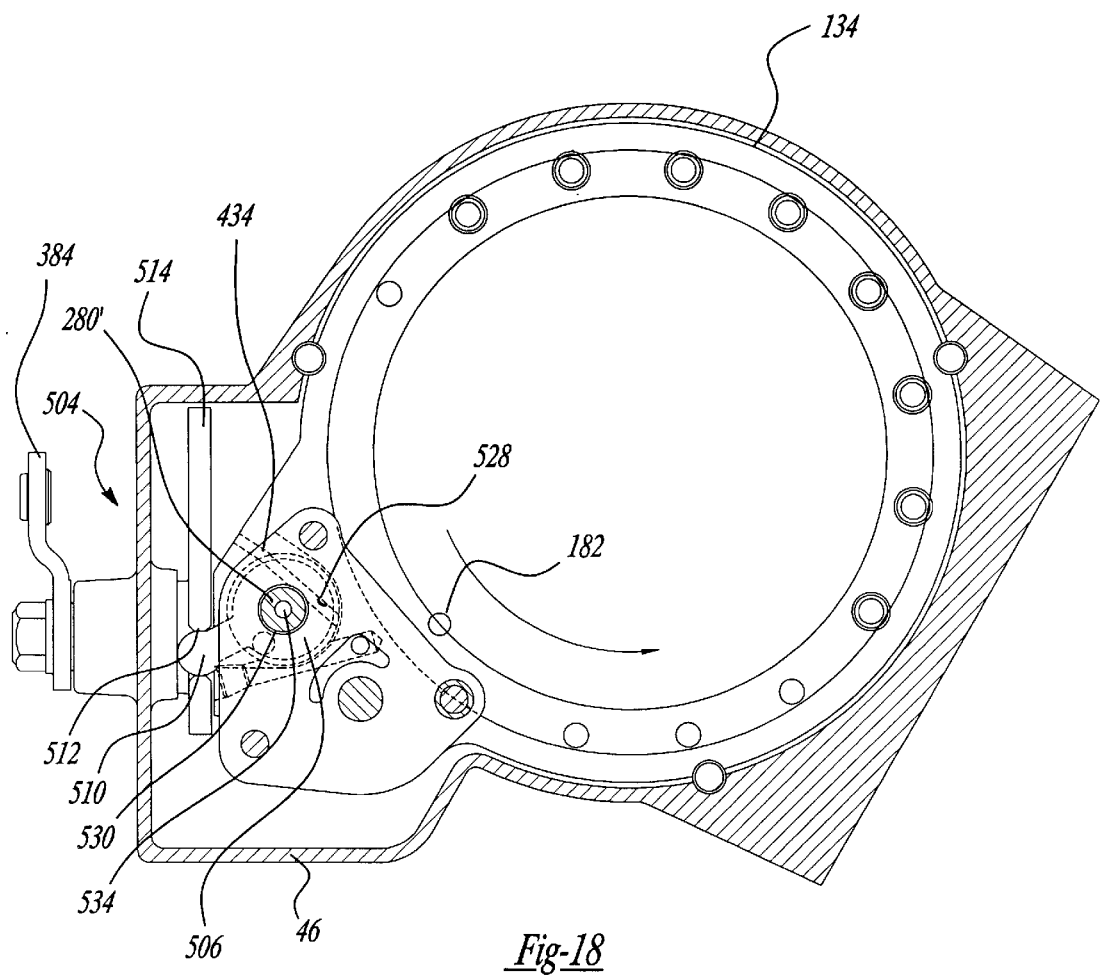
FIG. 18 is a sectional view taken generally along the line 18—18 of FIG. 15.
Figure 19:
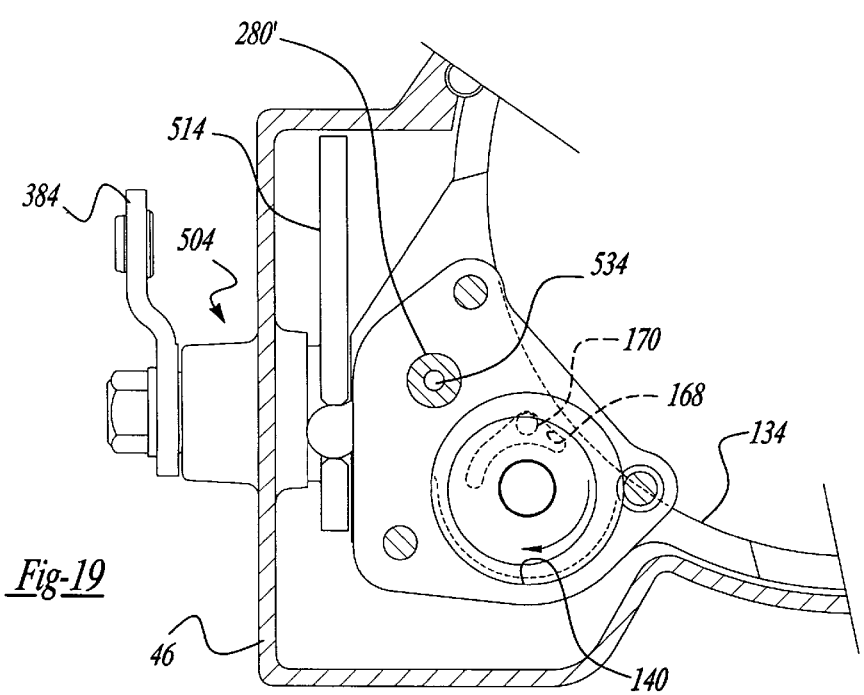
FIG. 19 is a view taken generally along the line 19—19 of FIG. 15.

Pump housing 134 defines valve chamber 420 within which valve body 506 is retained for rotary movement on rail 280'. Supply bore 422 in pump housing 134 communicates with outlet passage 170 of pump chamber 140 for supplying pressure to accumulator 122 via inlet port 182 and with valve chamber 420. As before, supply bore 224 extends between valve chamber 420 and neutral chamber 226 while supply bore 252 extends between valve chamber 420 and low-range chamber 254. Valve body 506 is shown in FIGS. 16 and 20 to include a first inlet bore 516, a first circumferential pressure groove 518 in fluid communication with first inlet bore 516, an outlet bore 520 in fluid communication with first pressure groove 518, an outlet slot 522 communicating with outlet bore 520, and a pair of vent slots 524 and 526. In addition, FIG. 21 shows valve body 506 to further include a second inlet bore 528 communicating with a second circumferential pressure groove 530. To provide means for supplying fluid from second pressure groove 530 to mode chamber 376, rail 280' is formed to include radial bores 532 in communication with second pressure groove 530, an axial bore 534 communicating with radial bores 532, and an outlet bore 536 providing communication between mode chamber 376 and axial bore 534.

Figure 15:
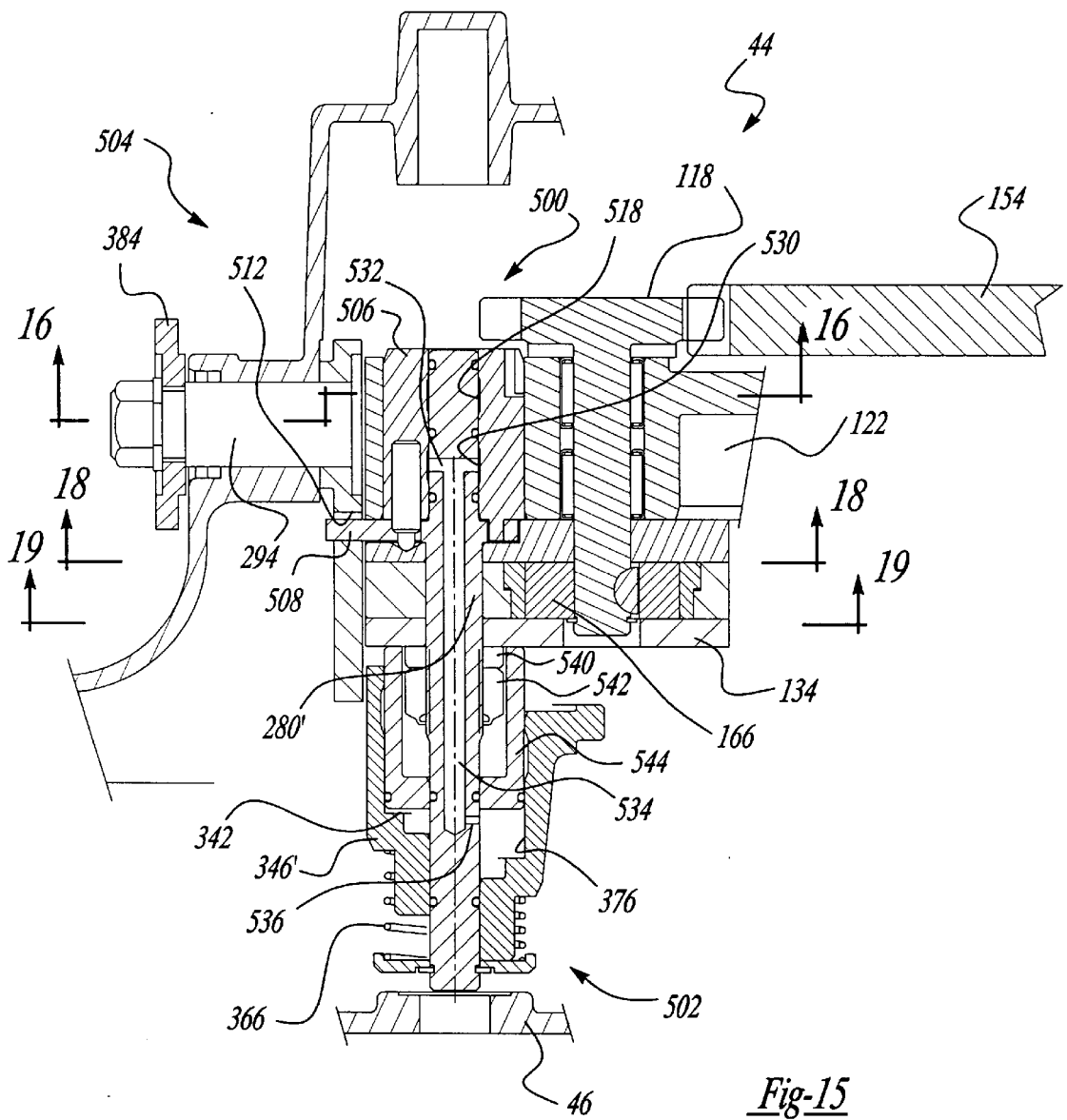
FIG. 15 is a partial sectional view of a further alternative embodiment for the hydraulic control valve associated with the hydraulic shift system of the present invention.

Referring to FIG. 15, rail 280' is shown non-rotatably mounted to pump housing 134 via a washer 540 and lock nut 542 which are located within a can-shaped housing 544 associated with mode shift assembly 502. Shift fork assembly 346' is mounted for sliding movement on housing 544. In particular, shift fork assembly 346' is shown in the left portion of FIG. 15 in a retracted position when mode sleeve 98 is in its 2WD position and is shown in the right portion of FIG. 15 in an extended position when mode sleeve 98 is in its 4WD position. Various seals are provided for sealing rail 280' relative to valve body 506 and housing 544 while an additional seal is provided for sealing shift fork assembly 346' relative to housing 544.

In operation, the two-wheel high-range drive mode is established with sector plate 514 in a 2wh sector position which, in turn, locates valve body 506 in a first valve position. With valve body 506 in the first valve position shown in FIG. 20A, second supply bore 252 and first supply bore 224 do not communicate with supply bore 422. Thus, springs 256 and 258 respectively associated with first piston 202 and second piston 204 forcibly bias each to its non-actuated position, thereby locating range sleeve 82 in the H position. Similarly, in this first valve position, second inlet bore 528 does not communicate with supply bore 422, but rather communicates with vent port 434, as shown in FIG. 21a. Thus, mode sleeve 98 is biased by spring 366 associated with fork assembly 346' into the 2WD position with any fluid in chamber 376 vented through outlet bore 536, axial bore 534, radial bores 532, and second pressure groove 530 into second inlet bore 528 from which it is vented to the sump through vent bore 434.

Figure 20A:
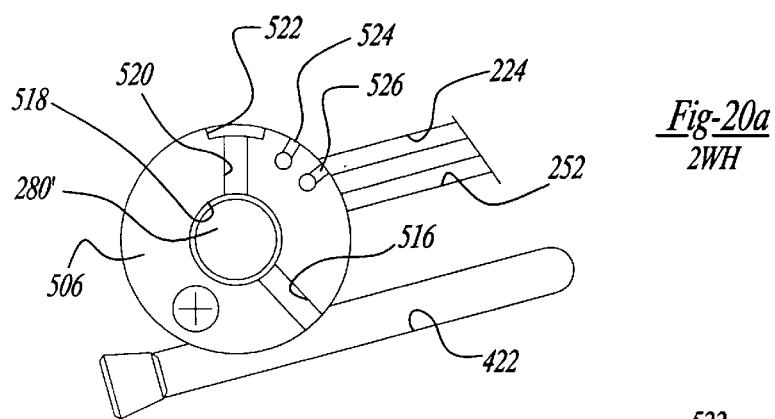
FIGS. 20a, 20b, 20c and 20d shows the components of the range shift assembly positioned to respectively establish a two-wheel high-range drive mode, a four-wheel high-range drive mode, a neutral mode, and a four-wheel low-range drive mode.
Figure 20B:
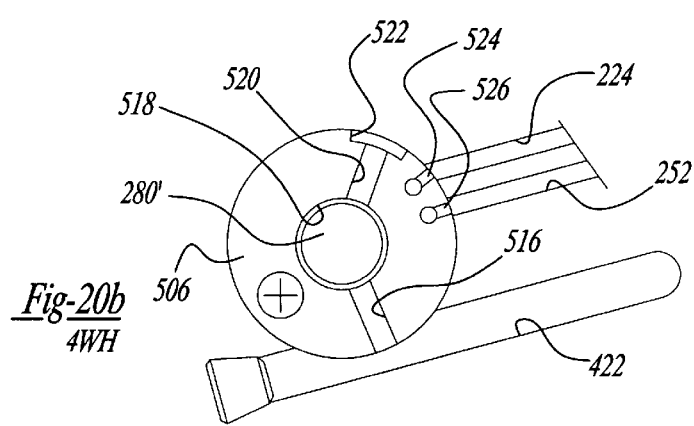

The four-wheel high-range drive mode is established by rotating sector plate 514 in the counter-clockwise direction to a 4wh sector position, via rotation of actuator shaft 294 . Since cam slot 512 of sector plate 514 engages cam plate lug 510 extending from valve body 506, counter-clockwise rotation of sector 514 causes clockwise rotation of valve body 506 to a second valve position, as shown in FIGS. 20B and 21B. In this second valve position, second supply bore 252 and first supply bore 224 do not communicate with supply bore 422 such that pistons 202 and 204 are maintained in their respective non-actuated positions and range sleeve 82 is maintained in the H position. In fact, supply bore 224 is shown communicating with vent slot 524 and supply bore 252 is shown communicating with vent slot 526, thereby venting fluid in neutral chamber 226 and low-range chamber 254 to the sump. In this second valve position, second inlet bore 528 no longer communicates with vent port 434, but rather communicates with supply bore 422, thereby providing hydraulic pressure from supply bore 422 to chamber 376 through second pressure groove 530, radial bores 532, axial bore 534 and outlet bore 536. Upon receipt of hydraulic pressure into chamber 376, mode sleeve 98 is moved to the 4WD position.

Figure 20C:
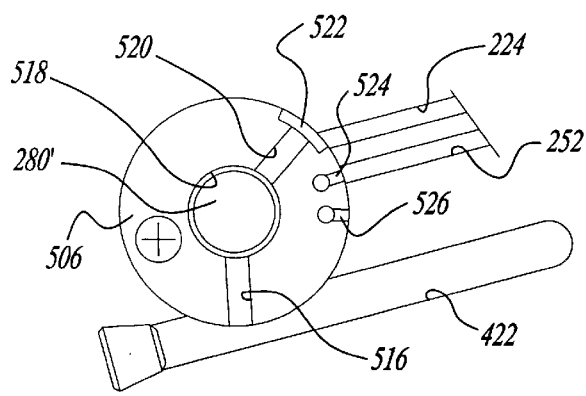

Further rotation of sector plate 514 in the counter-clockwise direction to a Neu sector position causes clockwise rotation of valve body 506 to a third valve position for establishing the neutral mode. In the third valve position, supply bore 422 communicates with first supply bore 224 via first inlet bore 516, first pressure groove 518, outlet bore 520 and outlet slot 522 for delivering hydraulic fluid to neutral chamber 226, as is shown in FIG. 20C. Upon receipt of hydraulic fluid in neutral chamber 226, first piston 202 is forcibly moved from its non-actuated position to its actuated position for moving range sleeve 82 to its N position. In this third valve position, second supply bore 252 communicates with vent slot 524 such that second piston 204 is maintained in its non-actuated position. Additionally, second outlet bore 528 still communicates with supply bore 422 and second pressure groove 530, thereby maintaining mode sleeve 98 in the 4WD position, as shown in FIG. 21C.

Figure 20D:
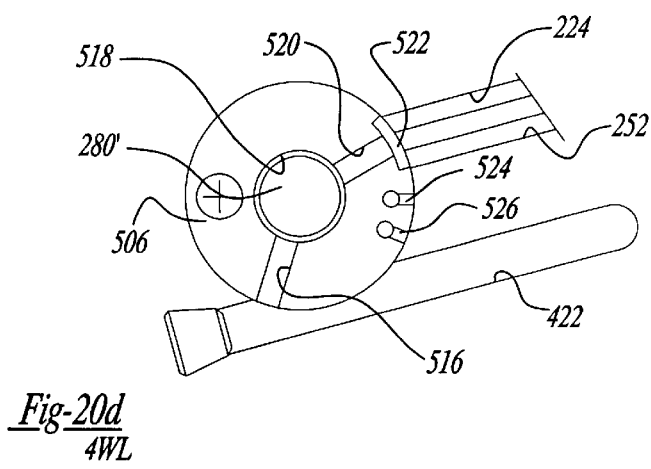

Finally, the four-wheel low-range drive mode is established by rotating sector plate 514 in a counter-clockwise direction to the 4wl sector position which causes valve body 506 to rotate in a clockwise direction to a fourth valve position. In the fourth valve position, outlet bore 520 and slot 522 are in fluid communication with both first supply bore 224 and second supply bore 252, as shown in FIG. 20D, thereby moving second piston 204 from its non-actuated position to its actuated position for moving range sleeve 82 from its N position to its L position. As shown in FIG. 21D, in the fourth valve position mode sleeve 98 is maintained in the 4WD position.

As is obvious, clockwise rotation of sector plate 514 via actuator shaft 294 from its 4wl sector position sequentially in reverse order through the other sector positions causes counter-clockwise rotation of valve body 506 from its fourth valve position sequentially through its other valve positions to establish the corresponding drive modes. Such rotary action of valve body 506 functions to sequentially vent low-range chamber 254 and then neutral chamber 226 and permit movement of range sleeve 82 from its L position through its N position into its H position when a high-range drive mode is selected. Similarly, pressure is maintained in mode chamber 376 until valve body 506 is moved from its second valve position to its first valve position whereat it is placed in communication with vent 434. Actuator shaft 294 can once again be rotated either manually or with a power-operated actuator.

One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case comprising:
   an input shaft;
   a first output shaft;
   a gear reduction member driven by said input shaft at a reduced speed ratio relative thereto;

a range sleeve mounted for rotation with said first output shaft and movement between a high-range position for coupling said first output shaft to said input shaft, a low-range position for coupling said first output shaft to said gear reduction member, and a neutral position for uncoupling said first output shaft from said input shaft and said gear reduction member;

a housing defining first and second chambers;

a first piston coupled to said range sleeve and supported in said first chamber for movement between a non-actuated position and an actuated position;

a second piston coupled to said range sleeve and supported in said second chamber for movement between a non-actuated position and an actuated position;

a source of pressurized fluid; and a control valve for controlling the supply of pressurized fluid to said first and second chambers, said control valve operable in a first mode to inhibit the supply of pressurized fluid to said first and second chambers for locating said first and second pistons in their respective non-actuated positions and said range sleeve in said high-range position, said control valve is operable in a second mode to supply pressurized fluid to said first chamber for causing movement of said first piston from its non-actuated position to its actuated position for moving said range sleeve from said high-range position to said neutral position, and said control valve is operable in a third mode to supply pressurized fluid to said first and second chambers for maintaining said first piston in its actuated position and moving said second piston from its non-actuated position to its actuated position for causing movement of said range sleeve from said neutral position to said low-range position.

2. The transfer case of claim 1 wherein said source of pressurized fluid includes a pump and an accumulator in communication with an inlet to said control valve.

3. The transfer case of claim 2 wherein said accumulator comprises a third piston supported in a third chamber defined in said housing.

4. The transfer case of claim 2 wherein said pump is mounted in said housing and generates pressure in response to rotation of said input shaft.

5. The transfer case of claim 1 further comprising a first spring acting on said first piston for urging said first piston toward its non-actuated position, and a second spring acting on said second piston for urging said second piston toward its non-actuated position.

6. The transfer case of claim 1 wherein said control valve includes a valve body having a pressure groove formed therein which is in constant fluid communication with said source of pressurized fluid, and a valve sleeve mounted for sliding movement on said valve body and having first and second supply bores formed therein respectively communicating with said first and second chambers, said valve sleeve operable in a first valve position to place said first and second supply bores in communication with a vent, said valve sleeve is operable in a second valve position for placing said first supply bore in communication with said pressure groove while maintaining said second supply bore in communication with said vent, and said valve sleeve is operable in a third valve position for placing said first and second supply bores in communication with said pressure groove.

7. The transfer case of claim 1 wherein said control valve includes a valve body having a fluid inlet in fluid communication with said source of pressurized fluid and a vent in communication with a sump, and wherein said valve body is operable in a first valve position to place said first and second chambers in communication with said vent, said valve body is operable in a second valve position for placing said first chamber in fluid communication with said inlet while maintaining said second chamber in communication with said vent, and said valve body is operable in a third valve position for placing said first and second chambers in communication with said inlet.

8. The transfer case of claim 1 further comprising:

a second output shaft;

a mode sleeve supported for rotation with said first output shaft and movement relative thereto between a 2WD position for uncoupling said second output shaft from said first output shaft and a 4WD position for coupling said second output shaft to said first output shaft; and a third piston coupled to said mode sleeve and movable between a non-actuated position and an actuated position;

wherein said control valve includes a movable valve member operable in a first valve position to locate said third piston in its non-actuated position such that said mode sleeve is located in its 2WD position, and said valve member is operable in a second valve position to cause said third piston to move to its actuated position for moving said mode sleeve to its 4WD position.

9. The transfer case of claim 8 further comprising a synchronizer assembly for causing speed synchronization between said first and second output shafts in response to movement of said mode sleeve from its 2WD position to its 4WD position.

10. The transfer case of claim 1 further comprising:

a second output shaft;

a mode sleeve supported for rotation with said first output shaft and movement between a 2WD position uncoupling said second output shaft from said first output shaft and a 4WD position coupling said second output shaft to said first output shaft; and a third piston coupled to said mode sleeve and movable between a non-actuated position and an actuated position;

wherein said control valve is further operable to supply pressurized fluid to a third chamber for moving said third piston from its non-actuated position to its actuated position for locating said mode sleeve in said 4WD position.

11. The transfer case of claim 10 wherein control valve is operable in a fourth mode whereat the supply of pressurized fluid is interrupted to said first, second and third chambers for locating said range sleeve in said high-range position and locating said mode sleeve in said 2WD position.

12. The transfer case of claim 10 further comprising a synchronizer assembly for causing speed synchronization between said first and second output shafts in response to movement of said mode sleeve from its 2WD position to its 4WD position.

13. The transfer case of claim 10 further comprising a spring for normally biasing said third piston toward its non-actuated position.

14. A transfer case comprising:

an input shaft;

a first output shaft;

a planetary gearset having an input member driven by said input shaft and an output member driven by said input member at a reduced speed ratio relative to said input shaft;

a range sleeve mounted for rotation with said first output shaft and movable between three distinct range positions, said range sleeve is operable in a first range position for coupling said first output shaft for common rotation with said input shaft, said range sleeve is operable in a second range position for uncoupling said first output shaft from said input shaft and said output member, and said range sleeve is operable in a third range position for coupling said first output shaft for rotation with said output member of said planetary gearset;

a second output shaft;

a mode sleeve supported for rotation with said first output shaft and movable between a first mode position uncoupling said second output shaft from said first output shaft and a second mode position coupling said second output shaft for common rotation with said first output shaft;

a source of hydraulic pressure;

a first piston for moving said range sleeve from said first range position to said second range position in response to hydraulic pressure exerted thereon;

a second piston for moving said range sleeve from said second range position to said third range position in response to hydraulic pressure exerted thereon;

a third piston for moving said mode sleeve from said first mode position to said second mode position in response to hydraulic pressure exerted thereon;

a control valve controlling the supply of hydraulic pressure from said source to said first, second and third pistons, said control valve having a valve member operable in a first valve position for releasing hydraulic pressure exerted on said first, second and third pistons to locate said range sleeve in said first range position and said mode sleeve in said first mode position, said valve member is operable in a second valve position for releasing hydraulic pressure exerted on said first and second pistons and supplying hydraulic pressure to said third piston to locate said range sleeve in said first range position and said mode sleeve in said second mode position, said valve member is operable in a third valve position for supplying hydraulic pressure to said first and third pistons and releasing hydraulic pressure from said second piston to locate said range sleeve in said second range position and said mode sleeve in said second mode position, and said valve member is operable in a fourth valve position for supplying hydraulic pressure to said first, second and third pistons to locate said range sleeve in said third range position and said mode sleeve in said second mode position; and a shift actuator for moving said valve member between its four distinct valve positions.

15. The transfer case of claim 14 wherein said source of hydraulic pressure includes a sump of hydraulic fluid, a pump and an accumulator in communication with said control valve.

16. The transfer case of claim 14 further comprising a pump housing defining a first piston chamber in which said first piston is supported, a second piston chamber in which said second piston is supported, a valve chamber in which said valve member is supported, an inlet providing fluid communication between said valve chamber and said source of hydraulic pressure, a first supply pathway between said valve chamber and said first piston chamber, and a second supply pathway between said valve chamber and said second piston chamber.

17. The transfer case of claim 14 further comprising biasing springs acting on said first, second, and third pistons for normally exerting a biasing force thereon opposing said hydraulic pressure.

18. The transfer case of claim 14 wherein said movable valve member is a rotary valve body having a fluid inlet in communication with said source and a vent in communication with a sump, said valve body is operable in said first valve position for placing said first, second and third pistons in communication with said vent, said valve body is operable in said second valve position for placing said third piston in communication with said inlet while maintaining said communication of said first and second pistons with said vent, said valve body is operable in said third valve position for maintaining said communication of said third piston with said inlet and said second piston with said vent while placing said first piston in communication with said inlet, and said valve body is operable in said fourth valve position for maintaining communication of said first and third pistons with said inlet while placing said second piston in communication with said inlet.

* * * * *